United States Patent [19]
Anzai et al.

[11] Patent Number: 5,747,204
[45] Date of Patent: May 5, 1998

[54] ELECTROPHOTOGRAPHIC PHOTOCONDUCTOR AND AROMATIC POLYCARBONATE RESIN FOR USE IN THE SAME

[75] Inventors: Mitsutoshi Anzai; Akihiro Imai, both of Kawasaki; Masaomi Sasaki; Hiroshi Tamura, both of Susono; Tomoyuki Shimada, Shizuoka-ken; Tetsuro Suzuki, Fuji; Masafumi Ohta, Susono, all of Japan

[73] Assignees: Ricoh Company, Ltd., Tokyo; Hodogaya Chemical Co., Ltd., Kawasaki, both of Japan

[21] Appl. No.: 665,702

[22] Filed: Jun. 18, 1996

Related U.S. Application Data

[63] Continuation-in-part of Ser. No. 562,154, Nov. 22, 1995, abandoned.

[30] Foreign Application Priority Data

| Nov. 25, 1994 | [JP] | Japan | 6-315721 |
| Nov. 25, 1994 | [JP] | Japan | 6-315722 |
| Sep. 22, 1995 | [JP] | Japan | 7-269175 |
| Sep. 22, 1995 | [JP] | Japan | 7-269176 |
| Nov. 29, 1995 | [JP] | Japan | 7-333992 |

[51] Int. Cl.$^6$ .................................... G03G 5/047
[52] U.S. Cl. ................................ 430/59; 430/83
[58] Field of Search ............................. 430/59, 83

[56] References Cited

U.S. PATENT DOCUMENTS

| 5,420,226 | 5/1995 | Hamer et al. | 430/59 |
| 5,480,753 | 1/1996 | Shimada et al. | 430/59 |
| 5,486,439 | 1/1996 | Sakakibara et al. | 430/83 |
| 5,585,214 | 12/1996 | Kashimura et al. | 430/58 |

*Primary Examiner*—Roland Martin
*Attorney, Agent, or Firm*—Oblon, Spivak, McClelland, Maier & Neustadt, P.C.

[57] ABSTRACT

An electrophotographic photoconductor includes an electroconductive support, and a photoconductive layer formed thereon, containing a novel aromatic polycarbonate resin having a repeat unit of formula (I):

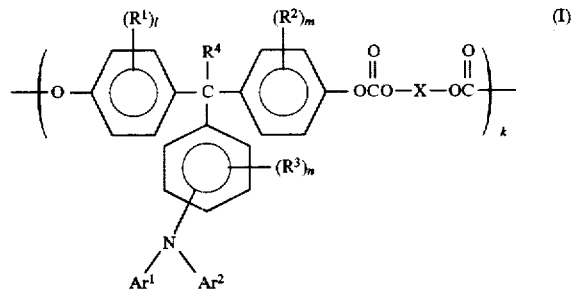

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

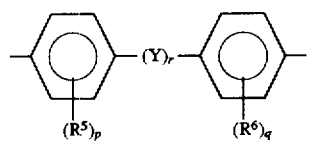

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—.

26 Claims, 15 Drawing Sheets

ELECTROPHOTOGRAPHIC PHOTOCONDUCTOR AND AROMATIC POLYCARBONATE RESIN FOR USE IN THE SAME

This application is a continuation-in-part of application Ser. No. 08/562,154 filed Nov. 22, 1995, now abandoned.

BACKGROUND OF THE INVENTION

1. Field of the Invention

The present invention relates to an electrophotographic photoconductor comprising an electroconductive support and a photoconductive layer formed thereon, comprising an aromatic polycarbonate resin as an effective component. In addition, the present invention also relates to the above-mentioned aromatic polycarbonate resin and the method of producing the aromatic polycarbonate resin, which aromatic polycarbonate resin is effective as a material for use in the electrophotographic photoconductor, or as an electroluminescent material.

2. Discussion of Background

Recently, organic photoconductors (OPC) are widely used in copying machines and printers. Such organic photoconductors comprise an electroconductive support and a photoconductive layer. The photoconductive layer may comprise a charge generation layer (CGL) and a charge transport layer (CTL) which are successively overlaid on the electroconductive support, thereby obtaining a layered electrophotographic photoconductor. The CTL of the conventional photoconductor is in the form of a film which comprises a binder resin and a low-molecular-weight charge transport material (CTM) dissolved in the binder resin. The addition of the low-molecular-weight charge transport material to the binder resin causes deterioration of the mechanical strength of the binder resin itself, and therefore, the durability of the photoconductor is impaired due to wear, flaw, and crack of the photoconductor.

Although some vinyl polymers such as polyvinyl anthracene, polyvinyl pyrene and poly-N-vinylcarbazole have been studied as high-molecular-weight photoconductive materials for forming a charge transport complex for use in the conventional organic photoconductor, such polymers are not satisfactory from the viewpoint of photosensitivity.

In addition, high-molecular-weight materials having the charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-183719, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between a photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

A polycarbonate resin obtained by the reaction between 2,2-bis(4-hydroxyphenyl)propane, which will be referred to as bisphenol A, and a carbonate precursor such as phosgene or diphenyl carbonate is conventionally known as one of the representative examples of the aromatic polycarbonate resin. The above-mentioned aromatic polycarbonate resin obtained from the bisphenol A has excellent properties in transparency, heat resistance, dimensional accuracy, and mechanical strength, so that it is used in a wide variety of fields. For example, this kind of polycarbonate resin is intensively studied as a binder resin for use in an organic photoconductor in the field of electrophotography.

As previously mentioned, however, the mechanical strength of the aforementioned aromatic polycarbonate resin is decreased by the addition of the low-molecular-weight charge transport material in the charge transport layer of the layered electrophotographic photoconductor.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that can be employed as a high-molecular-weight charge transport material in an organic electrophotographic photoconductor.

A third object of the present invention is to provide a method of producing the above-mentioned aromatic polycarbonate resin useful as the charge transport material for use in the photoconductor.

The above-mentioned first object of the present invention can be achieved by an electrophotographic photoconductor comprising an electroconductive support, and a photoconductive layer formed thereon comprising as an effective component an aromatic polycarbonate resin having a repeat unit of formula (I):

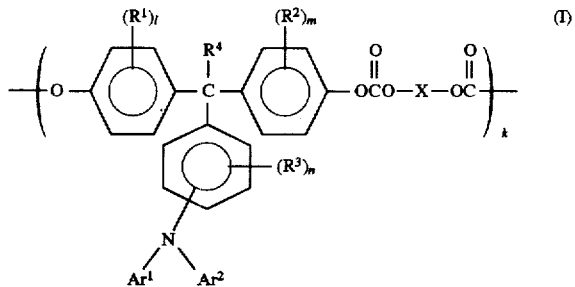

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

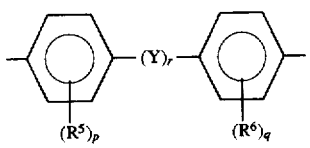

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—.

The second object of the present invention can be achieved by an aromatic polycarbonate resin having a repeat unit of formula (I):

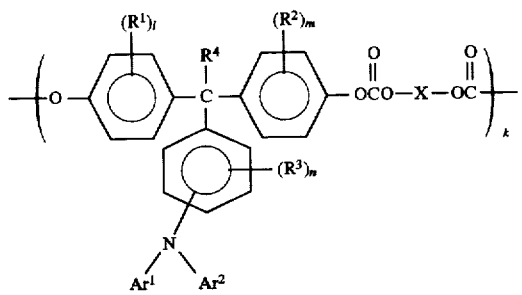

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

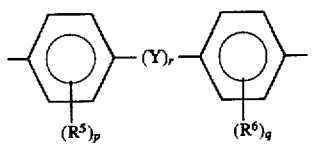

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—.

The third object of the present invention can be achieved by a method of producing an aromatic polycarbonate resin having a repeat unit of formula (I) which comprises the step of allowing a diphenol compound having a tertiary amino group represented by formula (II) to react with a bischloroformate compound of formula (III):

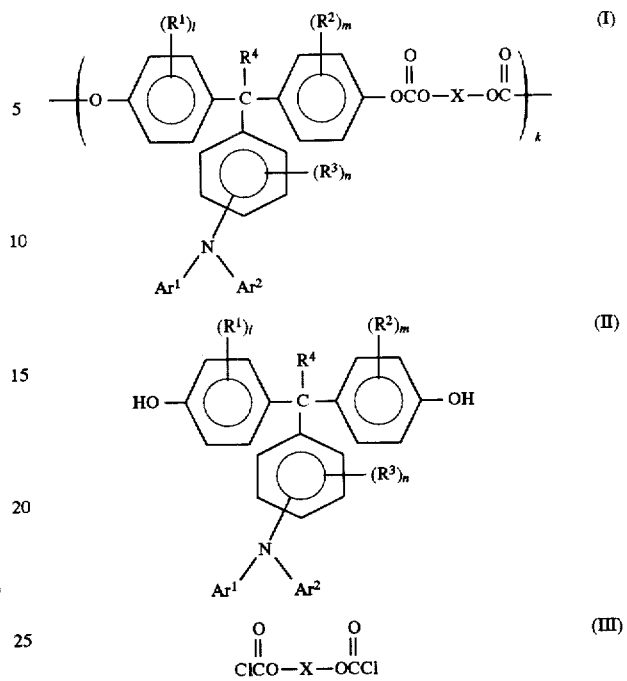

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

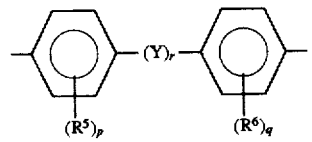

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—.

The third object can also be achieved by a method comprising the step of allowing a bischloroformate compound having a tertiary amino group represented by formula (IV) to react with a diol compound of formula (V):

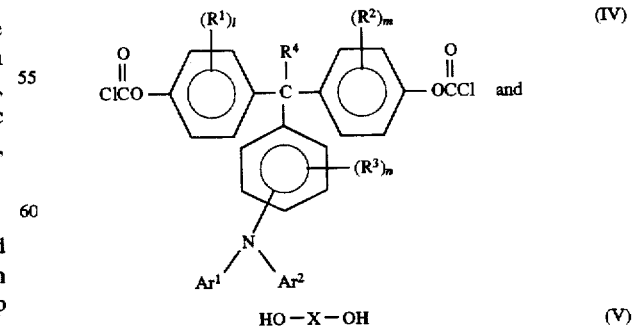

wherein $R^1$, $R^2$, $R^3$, $R^4$, $Ar^1$, $Ar^2$, l, m, n and X are the same as those previously defined.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
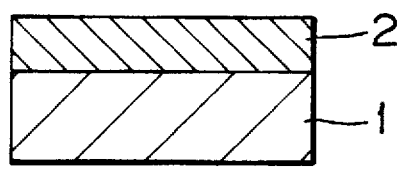
FIG. 1 is a schematic cross-sectional view of a first example of an electrophotographic photoconductor according to the present invention.

The photosensitivity and durability of the electrophotographic photoconductor according to the present invention are sufficiently high. This is because the photoconductive layer comprises an aromatic polycarbonate resin having a repeat unit with a triarylamine structure on the side chain thereof, represented by formula (I), which aromatic polycarbonate resin has the charge transporting properties and high mechanical strength.

In formula (I), specific examples of the halogen atom represented by $R^1$, $R^2$, $R^3$, $R^5$, or $R^6$ are fluorine, chlorine, iodine and bromine.

Specific examples of the alkyl group represented by $R^1$, $R^2$, $R^3$, $R^4$, $R^5$, or $R^6$ include straight-chain or branched alkyl groups having 1 to 12 carbon atoms, preferably 1 to 8 carbon atoms, and more preferably 1 to 4 carbon atoms. The above alkyl group may have a substituent such as a fluorine atom, hydroxyl group, cyano group, an alkoxyl group having 1 to 4 carbon atoms, or a phenyl group which may have a substituent selected from the group consisting of a halogen atom, an alkyl group having 1 to 4 carbon atoms and an alkoxyl group having 1 to 4 carbon atoms.

Specific examples of the above alkyl group include methyl group, ethyl group, n-propyl group, i-propyl group, tert-butyl group, sec-butyl group, n-butyl group, i-butyl group, trifluoromethyl group, 2-hydroxyethyl group, 2-cyanoethyl group, 2-ethoxyethyl group, 2-methoxyethyl group, benzyl group, 4-chlorobenzyl group, 4-methylbenzyl group, 4-methoxybenzyl group and 4-phenylbenzyl group.

As the aromatic hydrocarbon group represented by $Ar^1$, $Ar^2$, $R^5$ or $R^6$ in formula (I), there can be employed phenyl group, a non-fused hydrocarbon group, or a fused polycyclic hydrocarbon group.

Examples of the non-fused hydrocarbon group include biphenylyl group, and terphenylyl group.

As the fused polycyclic hydrocarbon group, a group having 18 or less carbon atoms for forming a ring is preferable. For example, there can be employed pentalenyl group, indenyl group, naphthyl group, azulenyl group, heptalenyl group, biphenylenyl group, as-indacenyl group, fluorenyl group, 9,9-dimethyl-2-fluorenyl group, s-indacenyl group, acenaphthylenyl group, pleiadenyl group, acenaphthenyl group, phenalenyl group, phenanthryl group, anthryl group, fluoranthenyl group, acephenanthrylenyl group, aceanthrylenyl group, triphenylenyl group, pyrenyl group, chrysenyl group and naphthacenyl group.

Specific examples of the substituent of the aromatic hydrocarbon group represented by $Ar^1$ or $Ar^2$ are a halogen atom such as fluorine, chlorine, bromine or iodine; and a straight-chain or branched alkyl group having 1 to 5 carbon atoms which may have a substituent such as a fluorine atom, cyano group, or a phenyl group which may have a substituent selected from the group consisting of a halogen atom and an alkyl group having 1 to 5 carbon atoms.

Specific examples of the aromatic polycarbonate resin having a repeat unit represented by formula (I) are shown in Table 1.

TABLE 1
| Compound No. | X | (R¹)ₗ | (R²)ₘ | (R³)ₙ | R⁴ | Position of —N | Ar¹ | Ar² |
|---|---|---|---|---|---|---|---|---|
| 1 | —CH₂CH₂OCH₂CH₂O— | H | H | H | CH₃ | 4″ | 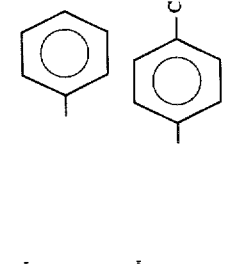 |  |
| 2 | " | H | H | H | CH₃ | 4″ | 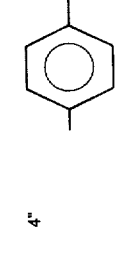 | 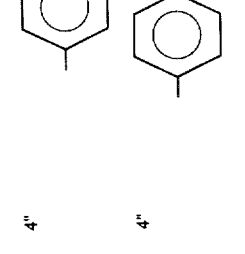 |
| 3 | " | H | H | H | CH₃ | 4″ |  |  |
| 4 | " | H | H | H | CH₃ | 4″ |  |  |

TABLE 1-continued
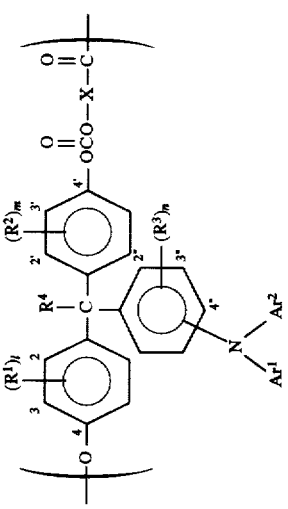
| Compound No. | X | (R¹)$_l$ | (R²)$_m$ | (R³)$_n$ | R⁴ | Position of —N< | Ar¹ | Ar² |
|---|---|---|---|---|---|---|---|---|
| 5 | " | H | H | H | CH₃ | 4" | | |
| 6 | " | H | H | H | CH₃ | 4" | | |
| 7 | " | H | H | H | CH₃ | 3" | | |
| 8 | " | H | H | H | CH₃ | 3" | | |
| 9 | —CH₂CH₂OCH₂CH₂O— | 3-CH₃ | 3'-CH₃ | H | CH₃ | 4" | | |
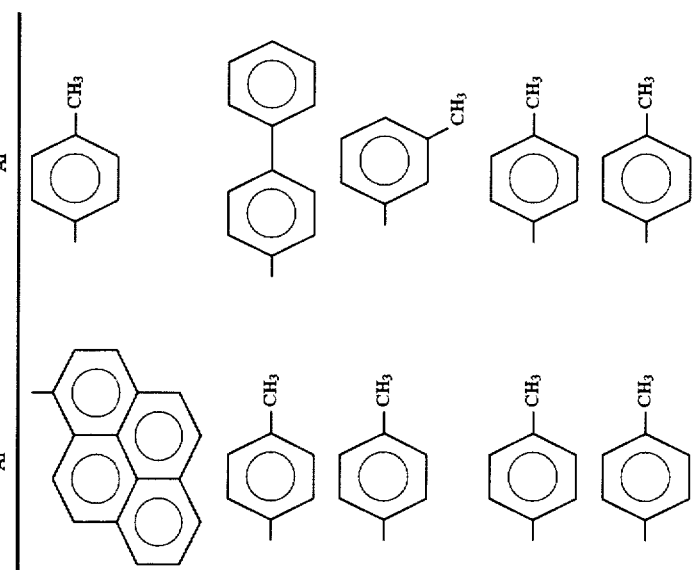

TABLE 1-continued
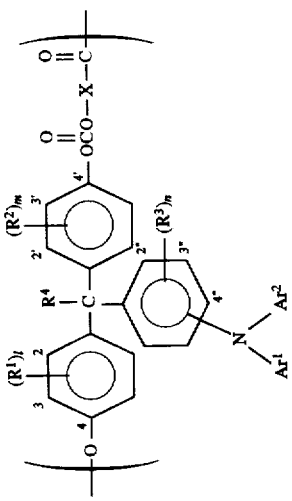
| Compound No. | X | $(R^1)_l$ | $(R^2)_m$ | $(R^2)_m$ | $(R^3)_n$ | $R^4$ | Position of —N< | $Ar^1$ | $Ar^2$ |
|---|---|---|---|---|---|---|---|---|---|
| 10 | " | H | H | H | H | CH₃ | 4" | 9,9-dimethylfluorenyl | 4-methylphenyl |
| 11 | " | H | H | H | H | CH₃ | 4" | 9,9-dimethylfluorenyl | 9,9-dimethylfluorenyl |
| 12 | ₊(CH₂)₆O— | H | H | H | H | CH₃ | 4" | 4-methylphenyl | 4-methylphenyl |
| 13 | " | H | H | H | H | CH₃ | 4" | phenyl | phenyl |

TABLE 1-continued

| Compound No. | X | (R¹)ₗ | (R²)ₘ | (R³)ₙ | R⁴ | Position of –N< | Ar¹ | Ar² |
|---|---|---|---|---|---|---|---|---|
| 14 | " | H | H | H | CH₃ | 4" | 4-methylphenyl | 3,5-dimethylphenyl / 4-methylphenyl |
| 15 | " | H | H | H | CH₃ | 4" | pyrenyl | 4-methylphenyl |
| 16 | 4,4'-isopropylidenediphenyleneoxy (bisphenol-A based) | H | H | H | CH₃ | 4" | 4-methylphenyl | 4-methylphenyl |
| 17 | 4,4'-isopropylidenediphenyleneoxy (bisphenol-A based) | H | H | H | CH₃ | 4" | phenyl | phenyl |

TABLE 1-continued
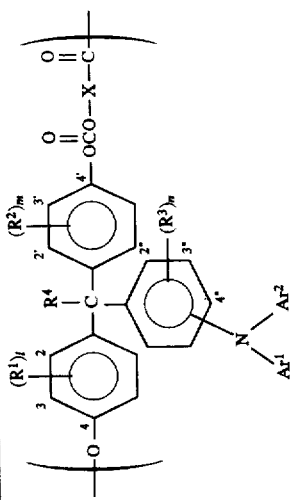
| Compound No. | X | $(R^1)_l$ | $(R^2)_m$ | $(R^3)_n$ | $R^4$ | Position of −N− | Ar¹ | Ar² |
|---|---|---|---|---|---|---|---|---|
| 18 | " | H | H | H | CH₃ | 4" | 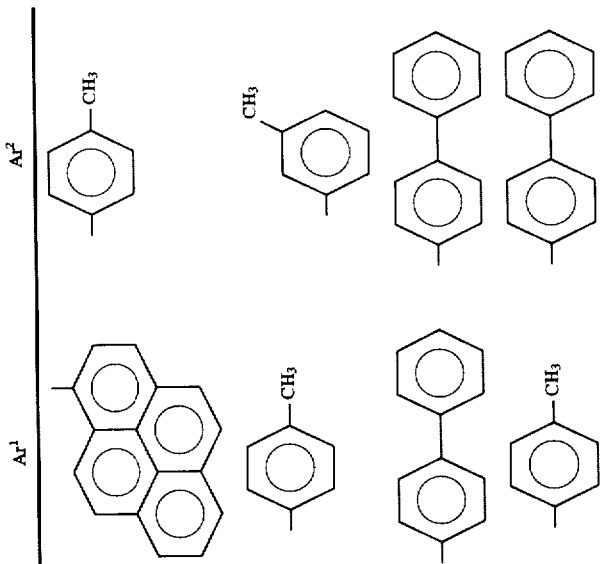 | |
| 19 | " | H | H | H | CH₃ | 4" | | |
| 20 | " | H | H | H | CH₃ | 4" | | |
| 21 | " | H | H | H | CH₃ | 4" | | |

TABLE 1-continued

| Compound No. | X | $(R^1)_l$ | $(R^2)_m$ | $(R^3)_n$ | $R^4$ | Position of —N | $Ar^1$ | $Ar^2$ |
|---|---|---|---|---|---|---|---|---|
| 22 | " | H | H | H | $CH_3$ | 4" | 9,9-dimethylfluorenyl | 4-methylphenyl |
| 23 | $-CH_2CH_2CH_2OCH_2CH_2CH_2O-$ | H | H | H | $CH_3$ | 4" | 4-methylphenyl | 4-methylphenyl |
| 24 | " | H | H | H | $CH_3$ | 4" | pyrenyl | 4-methylphenyl |
| 25 | 1,1-bis(4-methylphenyl)cyclohexyl-O- | H | H | H | $CH_3$ | 4" | 4-methylphenyl | 4-methylphenyl |

TABLE 1-continued
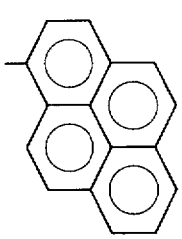
| Compound No. | X | (R¹)ₗ | (R²)ₘ | (R³)ₙ | R⁴ | Position of —N | Ar¹ | Ar² |
|---|---|---|---|---|---|---|---|---|
| 26 | — | H | H | H | CH₃ | 4" | 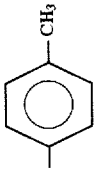 | 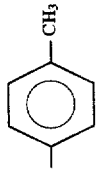 |
| 27 | 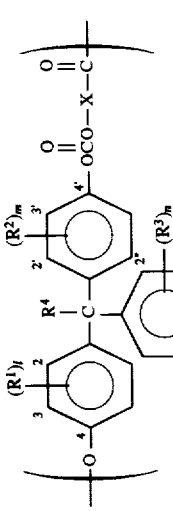 | H | H | H | CH₃ | 4" | 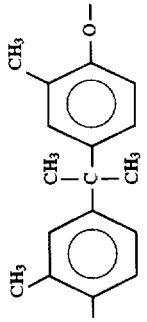 | 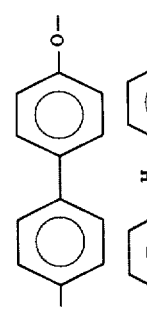 |
| 28 | 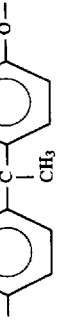 | H | H | H | CH₃ | 4" |  | 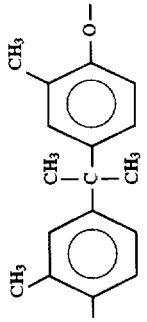 |
| 29 | 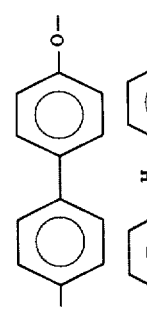 | H | H | H | CH₃ | 4" | 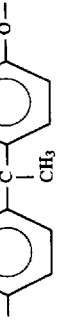 |  |

TABLE 1-continued
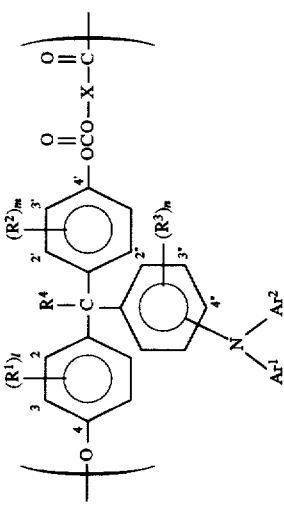
| Compound No. | X | $(R^1)_l$ | $(R^2)_m$ | $(R^3)_n$ | $R^4$ | Position of $-N\begin{smallmatrix}Ar^1\\Ar^2\end{smallmatrix}$ | $Ar^1$ | $Ar^2$ |
|---|---|---|---|---|---|---|---|---|
| 30 | 2-Cl,3-Cl-4-MeO-C₆H₃-C(CH₃)₂-C₆H₃ | H | H | H | CH₃ | 4" | 4-CH₃-C₆H₄ | 4-CH₃-C₆H₄ |
| 31 | 4-MeO-C₆H₄-CH₂CH₂-C₆H₄-4-CH₃ | H | H | H | CH₃ | 4" | 4-CH₃-C₆H₄ | 4-CH₃-C₆H₄ |
| 32 | 4-MeO-C₆H₄-CH₂-C₆H₄-4-CH₃ | H | H | H | CH₃ | 4" | 4-CH₃-C₆H₄ | 4-CH₃-C₆H₄ |
| 33 | 4-MeO-C₆H₄-O-C₆H₄-4-CH₃ | H | H | H | CH₃ | 4" | 4-CH₃-C₆H₄ | 4-CH₃-C₆H₄ |
| 34 | 4-MeO-C₆H₄-S-C₆H₄-4-CH₃ | H | H | H | CH₃ | 4" | 4-CH₃-C₆H₄ | 4-CH₃-C₆H₄ |

TABLE 1-continued

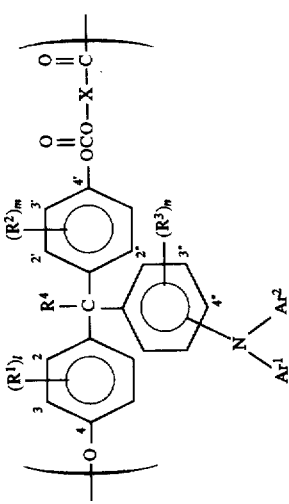

| Compound No. | X | $(R^1)_l$ | $(R^2)_m$ | $(R^3)_n$ | $R^4$ | Position of -N< | $Ar^1$ | $Ar^2$ |
|---|---|---|---|---|---|---|---|---|
| 35 | 4-phenylsulfinyl-phenoxy | H | H | H | $CH_3$ | 4" | 4-methylphenyl | 4-methylphenyl |
| 36 | 4-phenylsulfonyl-phenoxy | H | H | H | $CH_3$ | 4" | 4-methylphenyl | 4-methylphenyl |
| 37 | 4-[2,2,2-trifluoro-1-(trifluoromethyl)-1-phenylethyl]phenoxy | H | H | H | $CH_3$ | 4" | 4-methylphenyl | 4-methylphenyl |
| 38 | $\mathrm{+CH_2CH_2CH_2CH_2O+_{3.09}}$ | H | H | H | $CH_3$ | 4" | 4-methylphenyl | 4-methylphenyl |
| 39 | " | H | H | H | $CH_3$ | 4" | 4-methylphenyl | 3-methylphenyl |

TABLE 1-continued
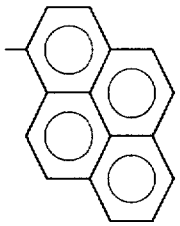
| Compound No. | X | $(R^1)_l$ | $(R^2)_m$ | $(R^3)_n$ | $R^4$ | Position of $-N\begin{smallmatrix}Ar^1\\Ar^2\end{smallmatrix}$ | $Ar^1$ | $Ar^2$ |
|---|---|---|---|---|---|---|---|---|
| 40 | " | H | H | H | $CH_3$ | 4" |  | |

The aromatic polycarbonate resin having a repeat unit of formula (I) according to the present invention, which is a novel compound, can be obtained by solution polymerization or interfacial polymerization.

According to the solution polymerization method, a diphenol compound having a tertiary amino group of the following formula (II) is dissolved in a solvent to prepare a solution of the diphenol compound, and an agent for deacidifying is added to the above prepared solution:

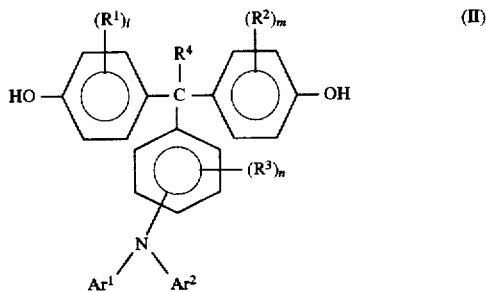

(II)

wherein $R^1$, $R^2$, $R^3$, $R^4$, $Ar^1$, $Ar^2$, l, m and n are the same as those previously defined.

Thereafter, a bischloroformate compound of the following formula (III), which can be obtained by using phosgene or liquefied phosgene according to the conventional method, is added to the above-mentioned solution of the diphenol compound, so that an aromatic polycarbonate resin of the present invention can be obtained:

(III)

wherein X is the same as that previously defined.

In this case, tertiary amine compounds such as trimethylamine, triethylamine and tripropylamine, and pyridine can be used as the deacidifying agents.

Examples of the solvent for use in the above-mentioned reaction are halogenated hydrocarbon solvents such as dichloromethane, dichloroethane, trichloroethane, tetrachloroethane, trichloroethylene, and chloroform; and cyclic ethers such as tetrahydrofuran and dioxane.

In addition, it is desirable to use phenol or p-tert-butylphenol as a molecular weight modifier.

The polymerization reaction is generally carried out at temperature in the range of 0° to 40° C., and terminated in several minutes to 5 hours.

According to the interfacial polymerization method, on the other hand, the polymerization reaction is carried out in the presence of an agent for deacidifying and a solvent.

In this case, hydroxides of alkali metals such as sodium hydroxide and potassium hydroxide, and pyridine can be used as the deacidifying agents in the above reaction.

As the solvent, halogenated hydrocarbon solvents such as dichloromethane and chlorobenzene can be employed.

In addition, a catalyst such as tertiary amine or a quaternary ammonium salt may be used to accelerate the reaction speed.

Furthermore, it is also desirable to use phenol or p-tert-butylphenol as a molecular weight modifier in the case of the interfacial polymerization.

The reaction temperature is generally in the range of 0° to 40° C., and the reaction is generally terminated in several minutes to 5 hours. It is desirable to maintain the reaction system to pH 10 or more.

To the aromatic polycarbonate resin thus produced, various additives such as an antioxidant, a light stabilizer, a thermal stabilizer, a lubricant and a plasticizer can be added when necessary.

Specific examples of the diphenol compound of formula (II) are as follows: 1,1-bis(4-hydroxyphenyl)-1-(4-N,N-ditolylaminophenyl)methane, 1,1-bis(3-methyl-4hydroxyphenyl)-1-(4-N,N-ditolylaminophenyl)methane, 1,1-bis(4-hydroxyphenyl)-1-(4-N,N-ditolylaminophenyl) ethane, 1,1-bis(3-methyl-4-hydroxyphenyl)-1-(4-N,N-ditolylaminophenyl)ethane, 1,1-bis(3-bromo-4-hydroxyphenyl)-1-(4-N,N-ditolylaminophenyl)ethane, 1,1-bis(4-hydroxyphenyl)-1-(4N,N-ditolylaminophenyl) propane, 1,1-bis(4-hydroxyphenyl)1-[4-N,N-bis(biphenylyl)aminophenyl]methane, 1,1-bis(4-hydroxyphenyl)-1-[4-N,N-bis(biphenylyl)aminophenyl] ethane, 1,1-bis(4-hydroxyphenyl)-1-[4-N,N-bis(biphenylyl) aminophenyl]propane, 1,1-bis(4-hydroxyphenyl)-1-|4-N,N-bis(methoxyphenyl)aminophenyl]methane, 1,1-bis(4-hydroxyphenyl)-1-|4-N,N-bis(methoxyphenyl) aminophenyl]ethane, hydroxphenyl)-1-[4-N,N-bis (methoxyphenyl)aminophyneyl]-methane, 1,1-bis(4-hydroxyphenyl)-1-[4-N,N-bis(methoxyphenyl) aminophenyl]propane, 1,1-bis(4-hydroxyphenyl)-1-(4-N,N-dipyrenylaminophenyl)ethane, 1,1-bis(4-hydroxyphenyl)-1-[4-(N-tolyl-N-biphenylyl)-aminophenyl]ethane, 1,1-bis(4-hydroxyphenyl)-1-[4-N,N-bis(4-methylbiphenylyl) aminophenyl]ethane, 1,1-bis(4-hydroxyphenyl)-1-(4-N,N-diphenylaminophenyl)ethane, and 1,1-bis(4-hydroxyphenyl)-1-(4-N-tolyl-N-pyrenyl-aminophenyl) ethane.

Further, a bischloroformate compound of the following formula (IV) can be derived from the above-mentioned diphenol compound of formula (II), and the aromatic polycarbonate resin according to the present invention can be obtained by allowing the bischloroformate compound of formula (IV) to react with a diol compound of the following formula (V):

(V): (IV)

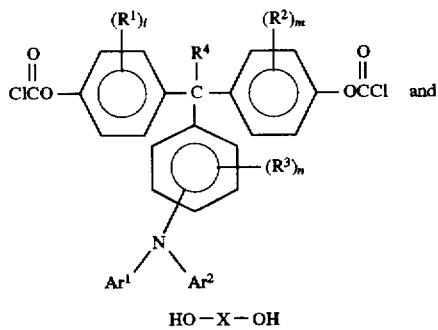

HO—X—OH (V)

wherein $R^1$, $R^2$, $R^3$, $R^4$, $Ar^1$, $Ar^2$, l, m, n and X are the same as those previously defined.

Examples of the diol compound represented by formula (V) include aliphatic diols such as 1,3-propanediol, 1,4-butanediol, 1,5-pentanediol, 1,6-hexanediol, 1,8-octanediol, 1,10-decanediol, 2-methyl-1,3-propanediol, 2,2-dimethyl-1,3-propanediol, 2-ethyl-1,3-propanediol, diethylene glycol, triethylene glycol, polyethylene glycol and polytetramethylene ether glycol; and cyclic aliphatic diols such as 1,4-cyclohexanediol, 1,3-cyclohexanediol and cyclohexane-1,4-dimethanol.

Examples of the diol having an aromatic ring are as follows: 4,4'-dihydroxydiphenyl, bis(4-hydroxyphenyl)-methane, 1,1-bis(4-hydroxyphenyl)ethane, 1,1-bis(4-hydroxyphenyl)-1-phenylethane, 2,2-bis(4-hydroxyphenyl)-propane, 2,2-bis(3-methyl-4-hydroxyphenyl)propane, 1,1- bis(4-hydroxyphenyl)cyclohexane, 2,2-bis(3-phenyl-4-hydroxyphenyl)propane, 2,2-bis(3-isopropyl-4-hydroxyphenyl)propane, 2,2-bis(4-hydroxyphenyl)butane, 2,2-bis(3,5-dimethyl-4-hydroxyphenyl)propane, 2,2-bis(3,5-dibromo-4-hydroxyphenyl)propane, 4,4'-dihydroxydiphenylsulfone, 4,4'-dihydroxydiphenylsulfoxide, 4,4'-dihydroxydiphenylsulfide, 3,3'-dimethyl-4,4'-dihydroxydiphenylsulfide, and 4,4'-dihydroxydiphenyloxide.

The aforementioned diol compound of formula (V), from which the bischloroformate compound of formula (III) can be derived, is subjected to preparation of the aromatic polycarbonate resin according to the present invention.

In the photoconductors according to the present invention, at least one aromatic polycarbonate resin having a repeat unit of the formula (I) is contained in the photoconductive layers 2, 2a, 2b, 2c, 2d and 2e. The aromatic polycarbonate resins can be employed in different ways, for example, as shown in FIGS. 1 through 6.

In an electrophotographic photoconductor as shown in FIG. 1, a photoconductive layer 2 is formed on an electroconductive support 1, which photoconductive layer 2 comprises an aromatic polycarbonate resin having a repeat unit of formula (I) and a sensitizing dye, with a binder agent (binder resin) being optionally added thereto. In this photoconductor, the aromatic polycarbonate resin works as a photoconductive material, through which charge carriers which are necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Figure 2:
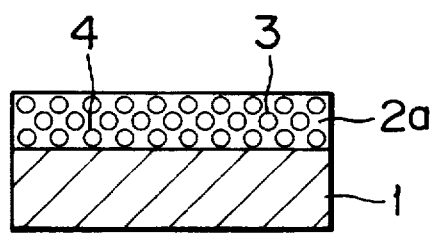
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this figure, reference numeral 1 indicates an electroconductive support. On the electroconductive support 1, there is formed a photoconductive layer 2a comprising a charge generation material 3 dispersed in a charge transport medium 4 which may be made of an aromatic polycarbonate resin having a repeat unit of formula (I) singly or in combination with the binder agent. In this embodiment, the aromatic polycarbonate resin constitutes the charge transport medium 4 singly or in combination with the binder agent. The charge generation material 3, which is, for example, an inorganic material or an organic pigment, generates charge carriers. The charge transport medium 4 accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4 and reach the surface of the charge generation material 3. The aromatic polycarbonate resin having a repeat unit of formula (I) does not substantially absorb light in the visible range, and it can work effectively as a charge transport material when used in combination with the charge generation material 3 which absorbs the light in the visible region and generates charge carriers. In addition, a low-molecular-weight charge transport material may be contained in the charge transport medium 4 comprising the aromatic polycarbonate resin.

Figure 3:
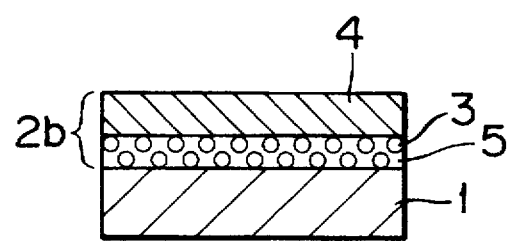
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In this figure, there is formed on an electroconductive support 1 a two-layered photoconductive layer 2b comprising a charge generation layer 5 containing the charge generation material 3, and a charge transport layer 4 containing an aromatic polycarbonate resin having a repeat unit of the previously described formula (I).

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and the charge carriers are accepted and transported by the charge transport layer 4. The generation and transportation of the charge carriers are performed by the same mechanism as that in the photoconductor shown in FIG. 2.

The charge transport layer 4 as shown in FIG. 3 is made of the aromatic polycarbonate resin according to the present invention by itself, or a mixture of the above-mentioned aromatic polycarbonate resin and the binder agent. To increase the charge generating efficiency, the aromatic polycarbonate resin may be contained in the charge generation layer 5, and a low-molecular-weight charge transport material may be contained in the photoconductive layer 2b.

Figure 4:
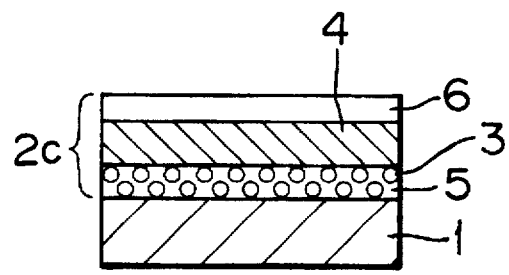
FIG. 4 is a schematic cross-sectional view of a fourth example of an electrophotographic photoconductor according to the present invention.

In the above photoconductor of FIG. 3, a protective layer 6 may be formed on the charge transport layer 4 as shown in FIG. 4. The protective layer 6 of the electro-photographic photoconductor as shown in FIG. 4 may comprise the aforementioned aromatic polycarbonate resin, optionally in combination with the binder agent. As a matter of course, it is effective that the protective layer 6 be provided on the conventionally employed charge transport layer of a low-molecular-weight charge transport material dispersed type.

In this photoconductor of FIG. 4, the aromatic polycarbonate resin may be contained in the charge generation layer 5, and a low-molecular weight charge transport material may be contained in the photoconductive layer 2c to increase the charge generating efficiency.

Such a protective layer 6 may be overlaid on the photoconductive layer 2a of the photoconductor as shown in FIG. 2.

Figure 5:
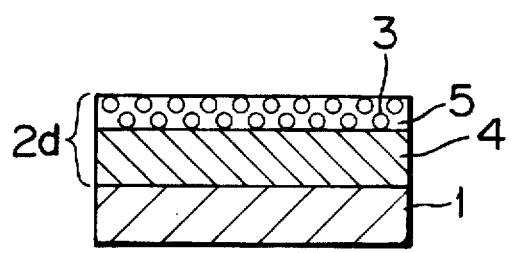
FIG. 5 is a schematic cross-sectional view of a fifth example of an electrophotographic photoconductor according to the present invention.

In an electrophotographic photoconductor according to the present invention as shown in FIG. 5, the overlaying order of the charge generation layer 5 and the charge transport layer 4 comprising the aromatic polycarbonate resin is reversed in view of the electro-photographic photoconductor as shown in FIG. 3. The mechanism of the generation and transportation of charge carriers is substantially the same as that of the photoconductor shown in FIG. 3.

In the photoconductor of FIG. 5, it is also effective that the aromatic polycarbonate resin be contained in the charge generation layer 5, and a low-molecular-weight charge transport material be contained in the photoconductive layer 2d in order to increase the charge generating efficiency.

Figure 6:
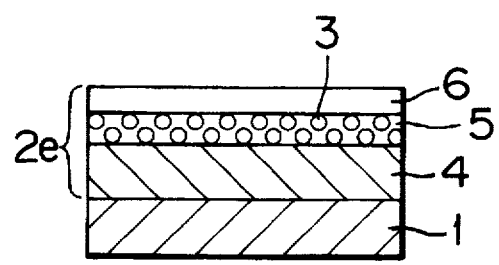
FIG. 6 is a schematic cross-sectional view of a sixth example of an electrophotographic photoconductor according to the present invention.

In the photoconductor as shown in FIG. 5, with the mechanical strength taken into consideration, a protective layer 6 may also be formed on the charge generation layer 5 as shown in FIG. 6. In this case, it is also effective to add the aromatic polycarbonate resin to the charge generation layer 5, and a low-molecular-weight charge transport material to the photo-conductive layer 2e.

When the electrophotographic photoconductor according to the present invention as shown in FIG. 1 is prepared, a solution comprising at least one aromatic polycarbonate resin having a repeat unit of the previously described formula (I) is prepared, with a binder agent optionally being used in combination with the polycarbonate resin, and a sensitizing dye is then added to the solution, so that a photoconductive layer coating liquid is obtained. The thus obtained photoconductive layer coating liquid is coated on an electroconductive support 1 and dried, so that a photoconductive layer 2 is formed on the electroconductive support 1.

It is proper that the thickness of the photoconductive layer 2 be in the range of 3 to 50 μm, more preferably in the range of 5 to 20 μm.

It is preferable that the amount of the aromatic polycarbonate resin of the present invention for use in the photoconductive layer 2 be in the range of 30 to 100 wt. % of the total weight of the photoconductive layer 2. It is preferable that the amount of the sensitizing dye for use in the photoconductive layer 2 be in the range of 0.1 to 5 wt. %, more preferably in the range of 0.5 to 3 wt. %, of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by dispersing finely-divided particles of the charge generation material 3 in a solution comprising at least one aromatic polycarbonate resin having a repeat unit of formula (I) alone, or optionally in combination with the binder agent, coating the above-prepared dispersion on the electroconductive support 1 and then drying the same to form the photoconductive layer 2a.

It is preferable that the thickness of the photoconductive layer 2a be in the range of 3 to 50 μm, more preferably in the range of 5 to 20 μm.

It is preferable that the amount of the aromatic polycarbonate resin of the present invention for use in the photoconductive layer 2a be in the range or 40 to 100 wt. % of the total weight of the photoconductive layer 2a. It is preferable that the amount of the charge generation material 3 for use in the photoconductive layer 2a be in the range of 0.1 to 50 wt. %, more preferably in the range of 1 to 20 wt. %, of the total weight of the photoconductive layer 2a.

Specific examples of the charge generation material 3 for use in the present invention are as follows: inorganic materials such as selenium, selenium—tellurium, cadmium sulfide, cadmium sulfide—selenium and α-silicon (amorphous silicon); and organic pigments including azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967), phthalocyanine pigments such as C.I. Pigment Blue 16 (C.I. 74100), indigo pigments such as C.I. Vat Brown 5 (C.I. 73410) and C.I. Vat Dye (C.I. 73030), and perylene pigments such as Algol Scarlet B and Indanthrene Scarlet R (made by Bayer Co., Ltd.). These charge generation materials may be used alone or in combination.

The electrophotographic photoconductor shown in FIG. 3 can be obtained by the following method:

The charge generation material 3 is vacuum-deposited on the electroconductive support 1 to form the charge generation layer 5 on the support 1. Alternatively, finely-divided particles of the charge generation material 3 are dispersed in an appropriate solvent, in which the binder agent may be dissolved when necessary, to prepare a coating liquid, and the thus prepared coating liquid is coated on the electroconductive support 1 and dried, so that the charge generation layer 5 is formed on the support 1. When necessary, the charge generation layer 5 may be subjected to surface treatment by buffing and adjustment of the thickness thereof. On the thus formed charge generation layer 5, a coating solution in which at least one aromatic polycarbonate resin having a repeat unit of formula (I) is dissolved, with the binder agent being optionally dissolved therein, is coated and dried, so that the charge transport layer 4 is formed on the charge generation layer 5. The same charge generation materials as employed in the above-mentioned photoconductive layer 2a can be used in the charge generation layer 5.

In this case, it is preferable that the thickness of the charge generation layer 5 be 5 μm or less, more preferably 2 μm or less. It is preferable that the thickness of the charge transport layer 4 be in the range of 3 to 50 μm, more preferably in the range of 5 to 20 μm. When the charge generation layer 5 is formed by coating the dispersion of the finely-divided particles of the charge generation material 3, it is preferable that the amount of finely-divided particles of the charge generation material 3 for use in the charge generation layer 5 be in the range of 10 to 100 wt. %, more preferably in the range of about 50 to 100 wt. %, of the total weight of the charge generation layer 5. It is preferable that the amount of the aromatic polycarbonate resin according to the present invention be in the range of 40 to 100 wt. % of the total weight of the charge transport layer 4.

The photoconductive layer 2b of the photoconductor shown in FIG. 3 may comprise a low-molecular-weight charge transport material as previously mentioned. Examples of the low-molecular-weight charge transport material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To prepare the photoconductor shown in FIG. 4, a coating liquid for the protective layer 6 in which the aromatic polycarbonate resin of the present invention or a mixture of the aromatic polycarbonate resin and the binder agent is dissolved is coated on the charge transport layer 4 of the photoconductor shown in FIG. 3, and dried.

It is preferable that the thickness of the protective layer 6 be in the range of 0.5 to 10 µm. It is preferable that the amount of the aromatic polycarbonate resin of the present invention for use in the protective layer 6 be in the range of 40 to 100 wt. % of the total weight of the protective layer 6.

The electrophotographic photoconductor shown in FIG. 5 can be obtained by the following method:

A coating solution in which the aromatic polycarbonate resin of the present invention or the mixture of the aromatic polycarbonate resin and the binder agent is dissolved is coated on the electroconductive support 1 and dried to form the charge transport layer 4. On the thus formed charge transport layer 4, a dispersion prepared by dispersing finely-divided particles of the charge generation material 3 in a solvent, in which the binder agent may be dissolved when necessary, is coated by spray coating and dried to form the charge generation layer 5 on the charge transport layer 4. The amount ratios of the components contained in the charge generation layer 5 and charge transport layer 4 are the same as those previously described in FIG. 3.

The electrophotographic photoconductor shown in FIG. 6 can be obtained by forming a protective layer 6 on the charge generation layer 5 of the photoconductor as shown in FIG. 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used for the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate.

Furthermore, in the electrophotographic photoconductor according to the present invention, an intermediate layer such as an adhesive layer or a barrier layer may be interposed between the electroconductive support and the photoconductive layer when necessary. Examples of the material for use in the intermediate layer are polyamide, nitrocellulose and aluminum oxide. It is preferable that the thickness of the intermediate layer be 1 µm or less.

When copying is performed by use of the photoconductor according to the present invention, the surface of the photoconductor is uniformly charged to a pre-determined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

Synthesis Example 1

[Synthesis of aromatic polycarbonate resin (Compound No. 1 in Table 2)]

In a stream of nitrogen, 4.85 g (10.0 mmol) of 1,1-bis(4-hydroxyphenyl)-1-(4-di-p-tolylaminophenyl)ethane and 3.04 g (30.0 mmol) of triethylamine were dissolved in 40 ml of dry tetrahydrofuran to prepare a solution (a). A solution (b) prepared by dissolving 2.31 g (10.0 mmol) of diethylene glycol bis(chloroformate) in 8 ml of dry tetrahydrofuran was added dropwise to the solution (a) at room temperature over a period of 30 minutes.

Subsequently, the above obtained reaction mixture was stirred at room temperature for 15 minutes, and then a solution (c) prepared by dissolving 0.04 g (0.4 mmol) of phenol in 2 ml of tetrahydrofuran was added to the reaction mixture, followed by stirring for 5 minutes.

Thereafter, triethylamine hydrochloride which separated out was removed from the reaction mixture by filtration, and the residual tetrahydrofuran solution was added dropwise to methanol.

The precipitated resin was filtered off, and dried under reduced pressure. Furthermore, the obtained resin was purified by repeating the process of dissolving the resin in tetrahydrofuran and precipitating it in methanol twice. The resin thus obtained was dried under reduced pressure, so that 6.11 g of an aromatic polycarbonate resin (Compound No. 1 in Table 2) having a repeat unit of the following formula (VI) according to the present invention was obtained in a yield of 94.9%.

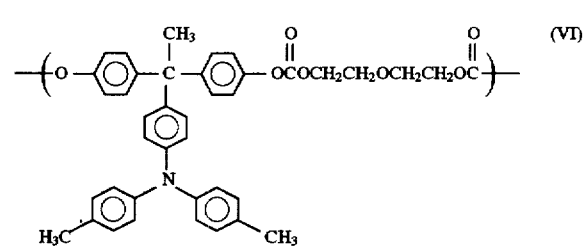

The glass transition temperature (Tg) of the thus obtained aromatic polycarbonate resin was 119° C. The polystyrene-reduced number-average molecular weight and weight-average molecular weight were respectively 19,000 and 46,000.

The results of the elemental analysis of the thus obtained compound were as follows:

|  | % C | % H | % N |
|---|---|---|---|
| Calculated | 74.63 | 5.79 | 2.18 |
| Found | 74.44 | 5.86 | 2.27 |

Figure 7:
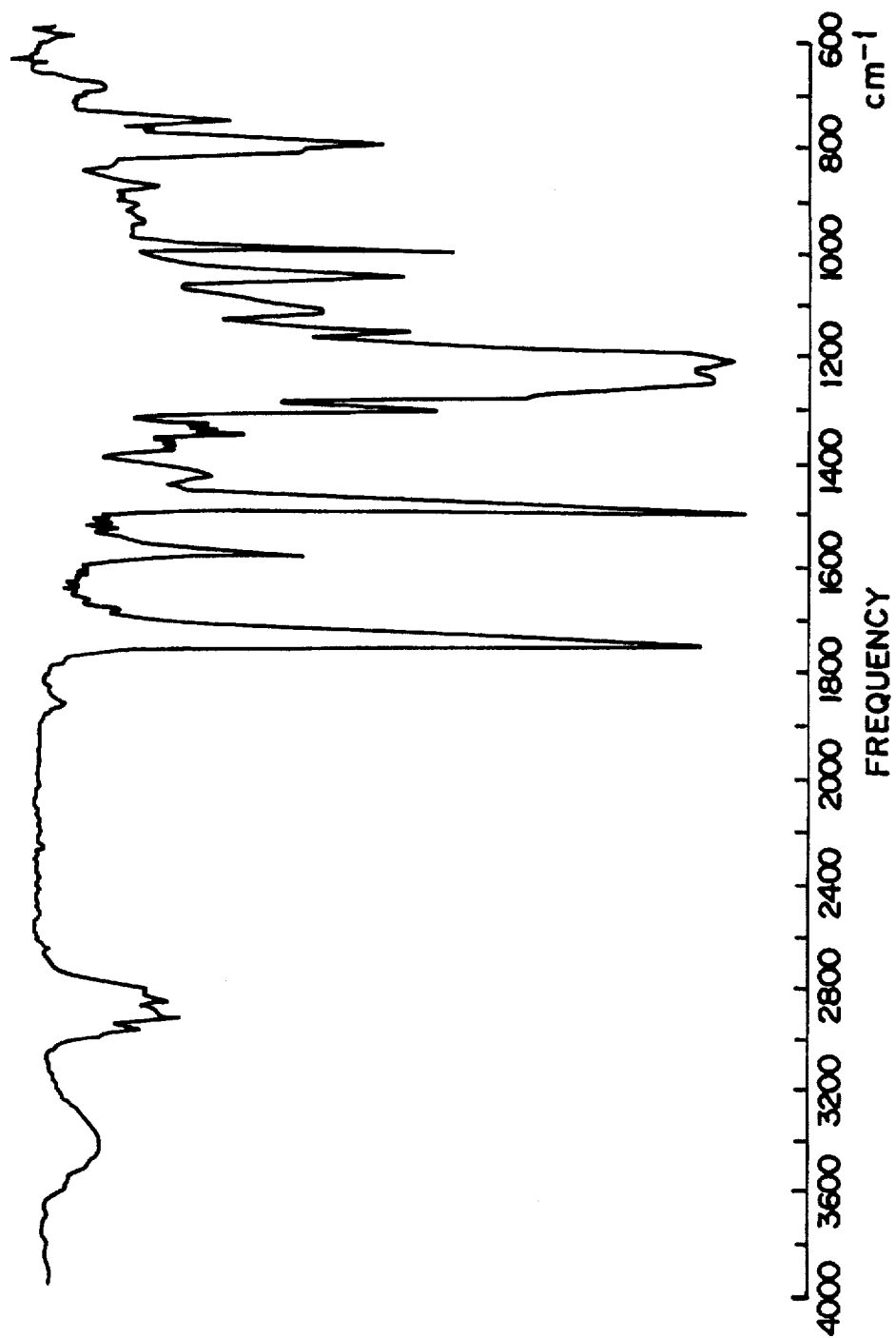
FIGS. 7 to 19 are IR spectra of aromatic polycarbonate resins according to the present invention taken by use of a KBr tablet, which aromatic polycarbonate resins are respectively synthesized in Synthesis Examples 1 to 13.
Figure 8:
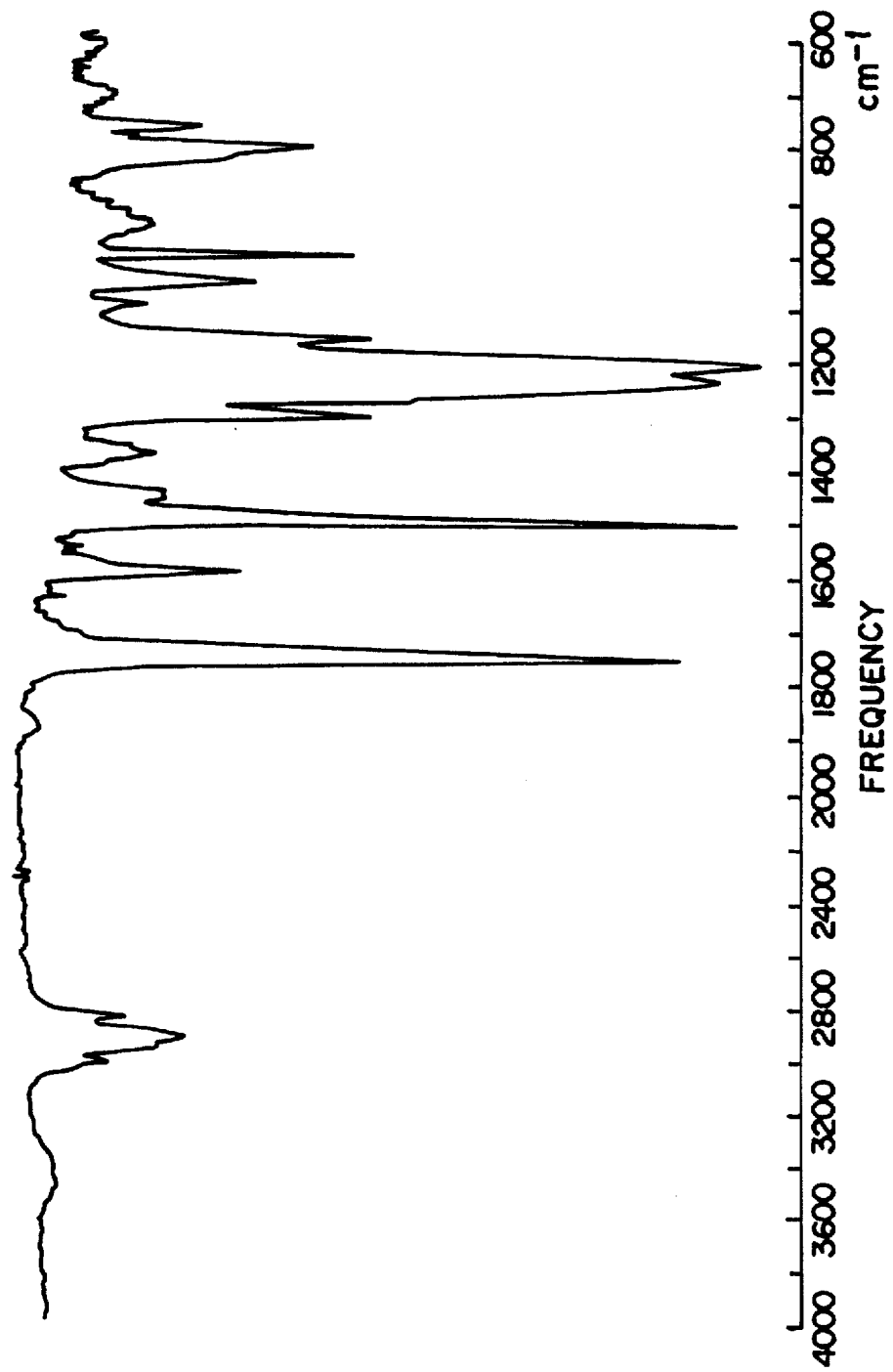
Figure 9:
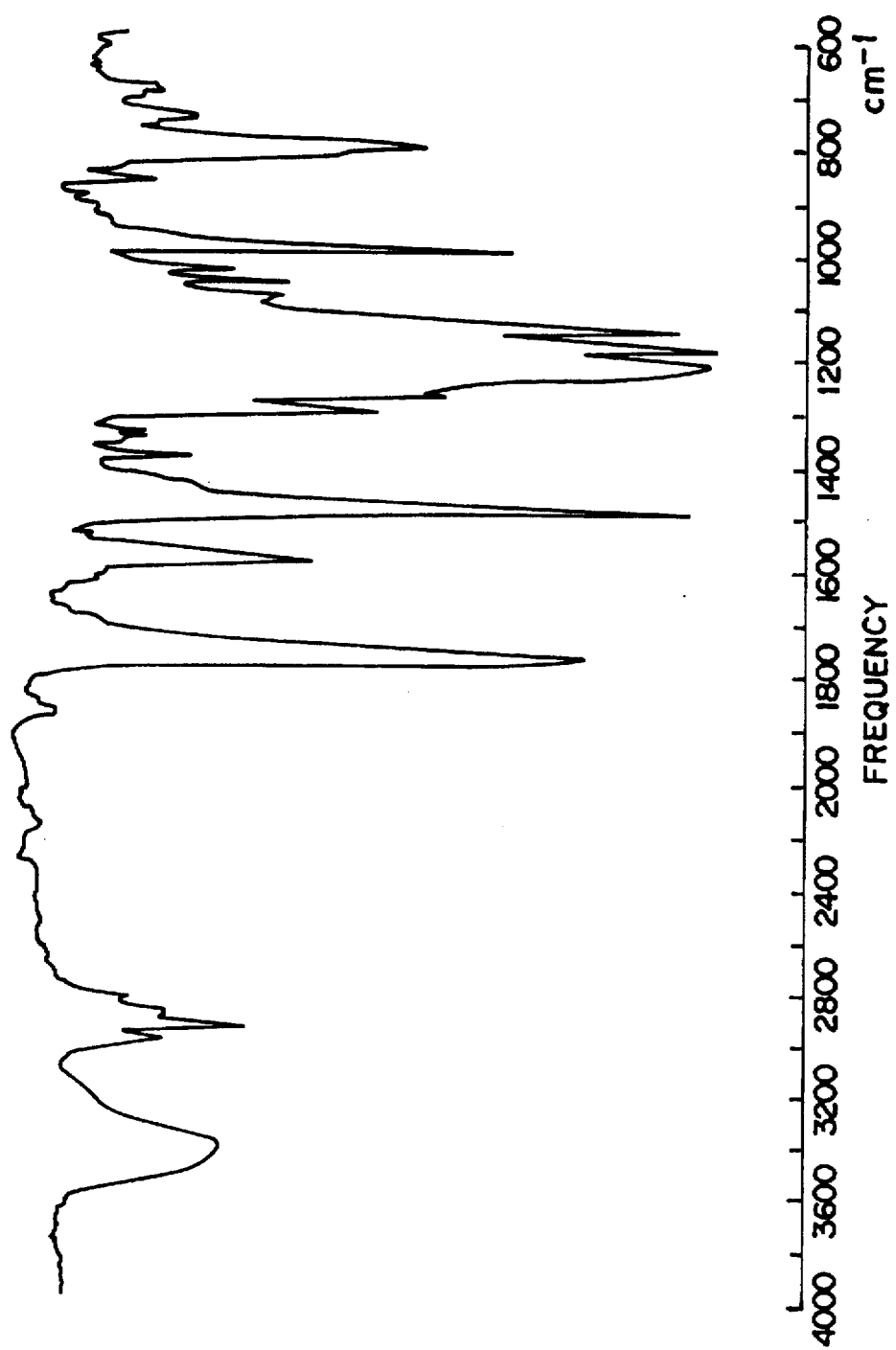
Figure 10:
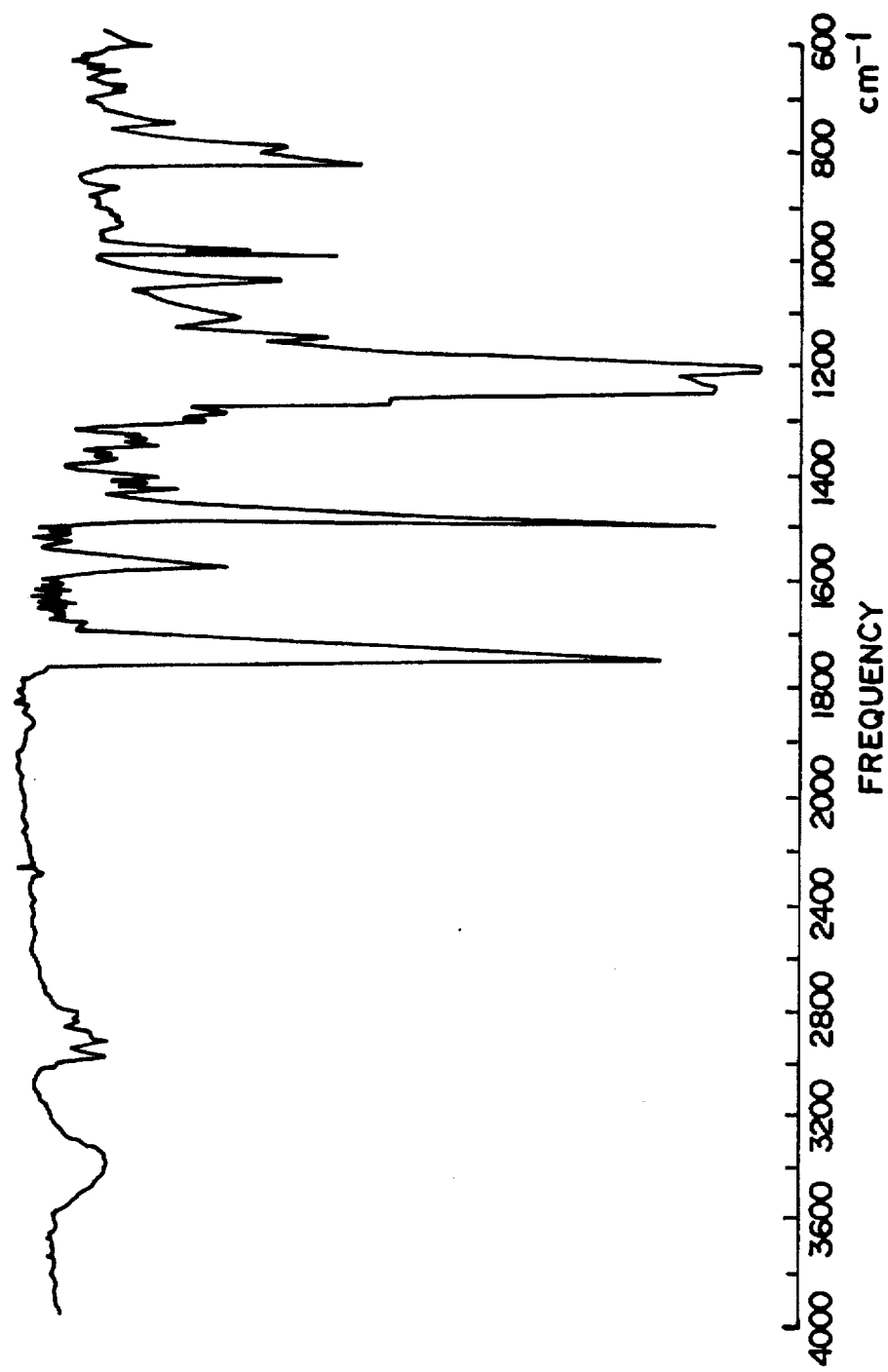
Figure 11:
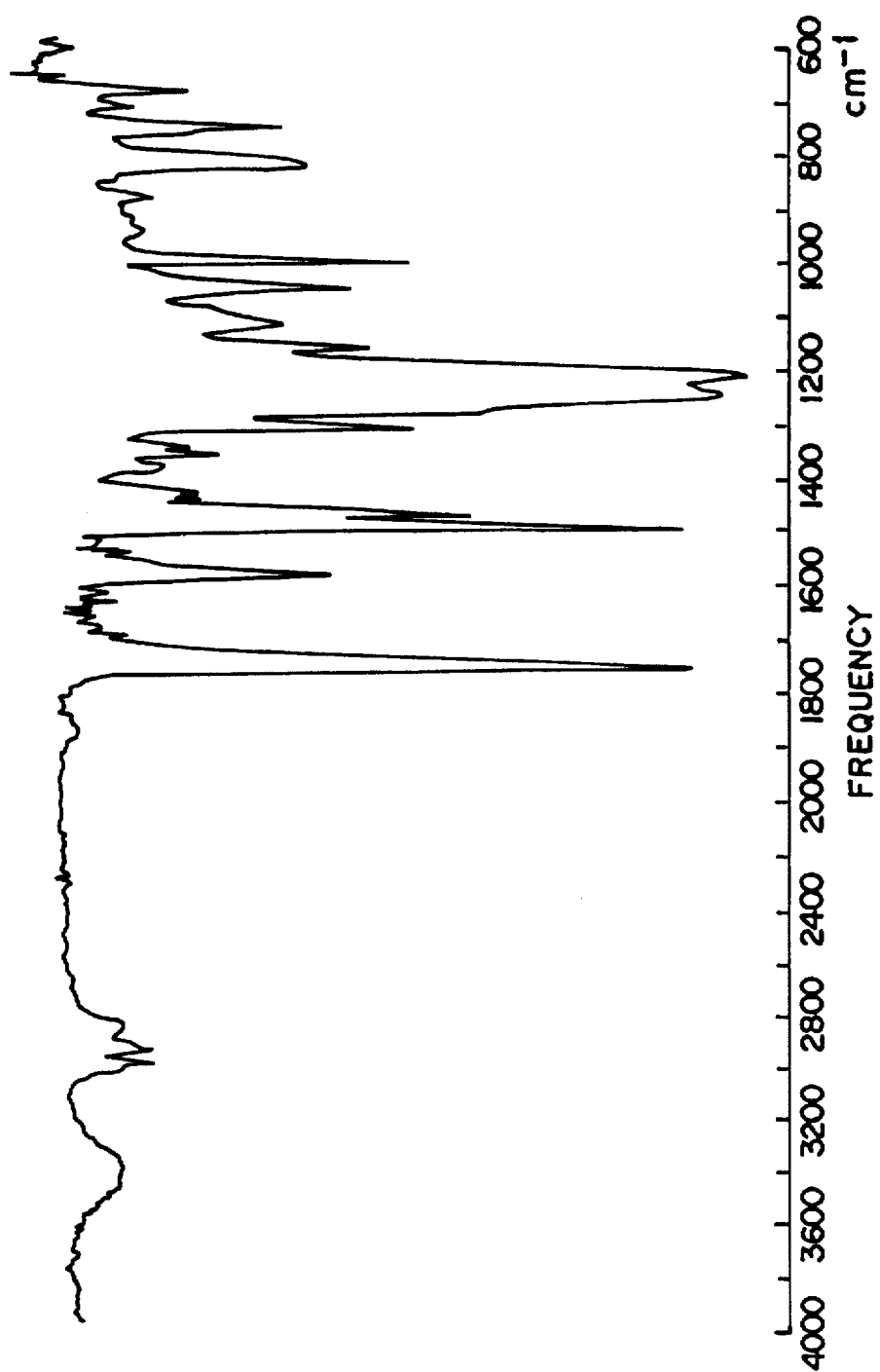
Figure 12:
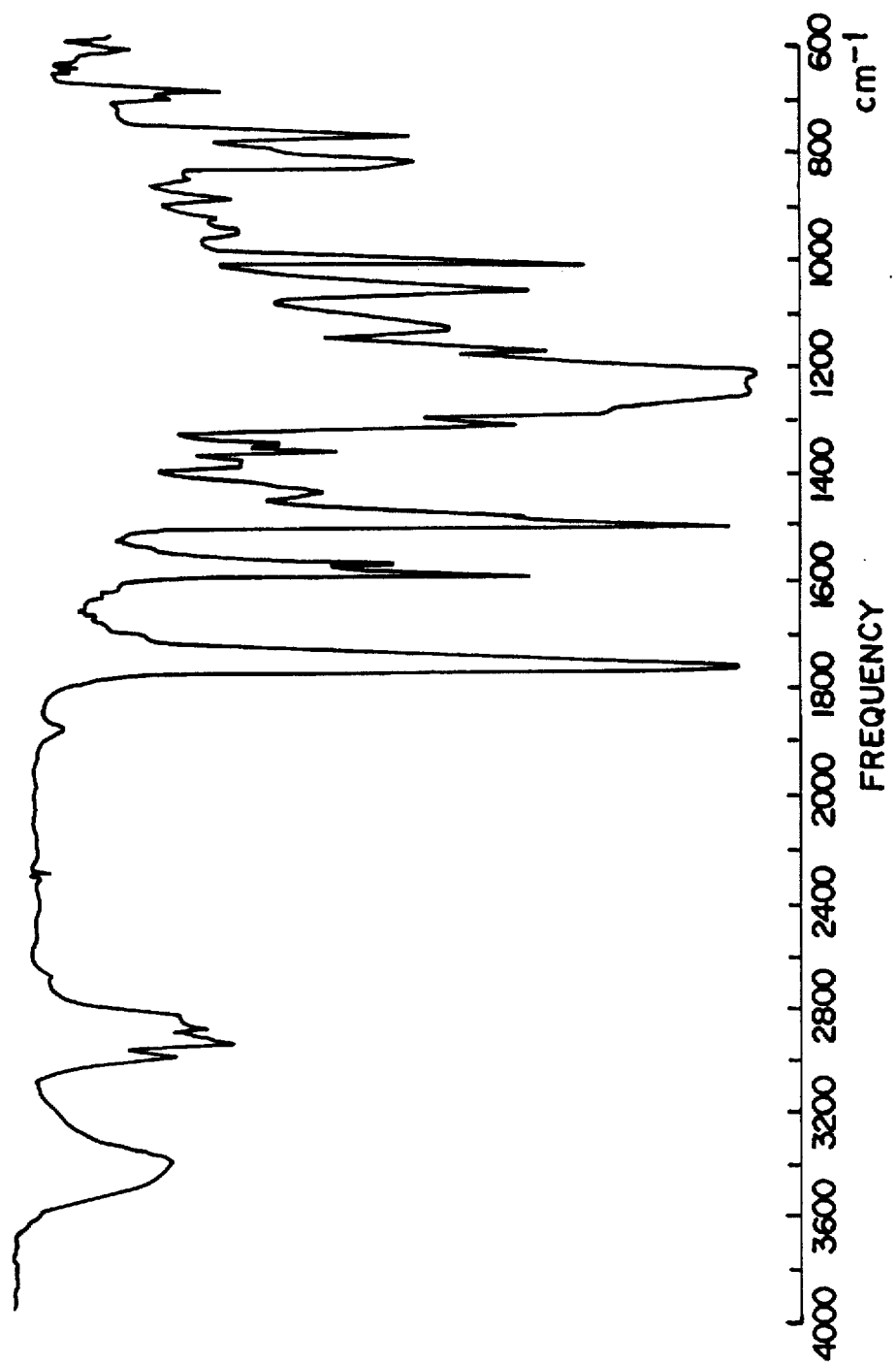
Figure 13:
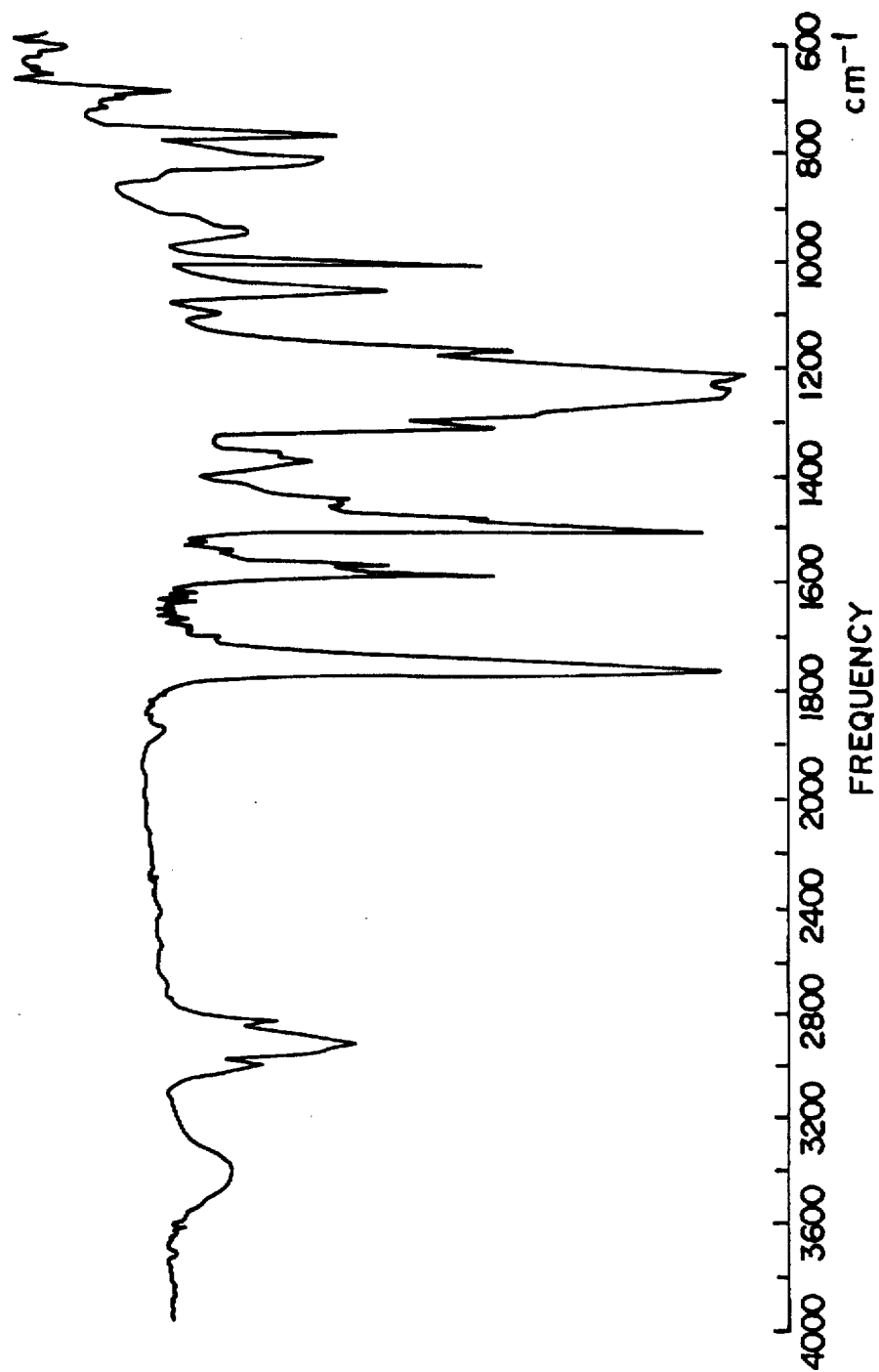
Figure 14:
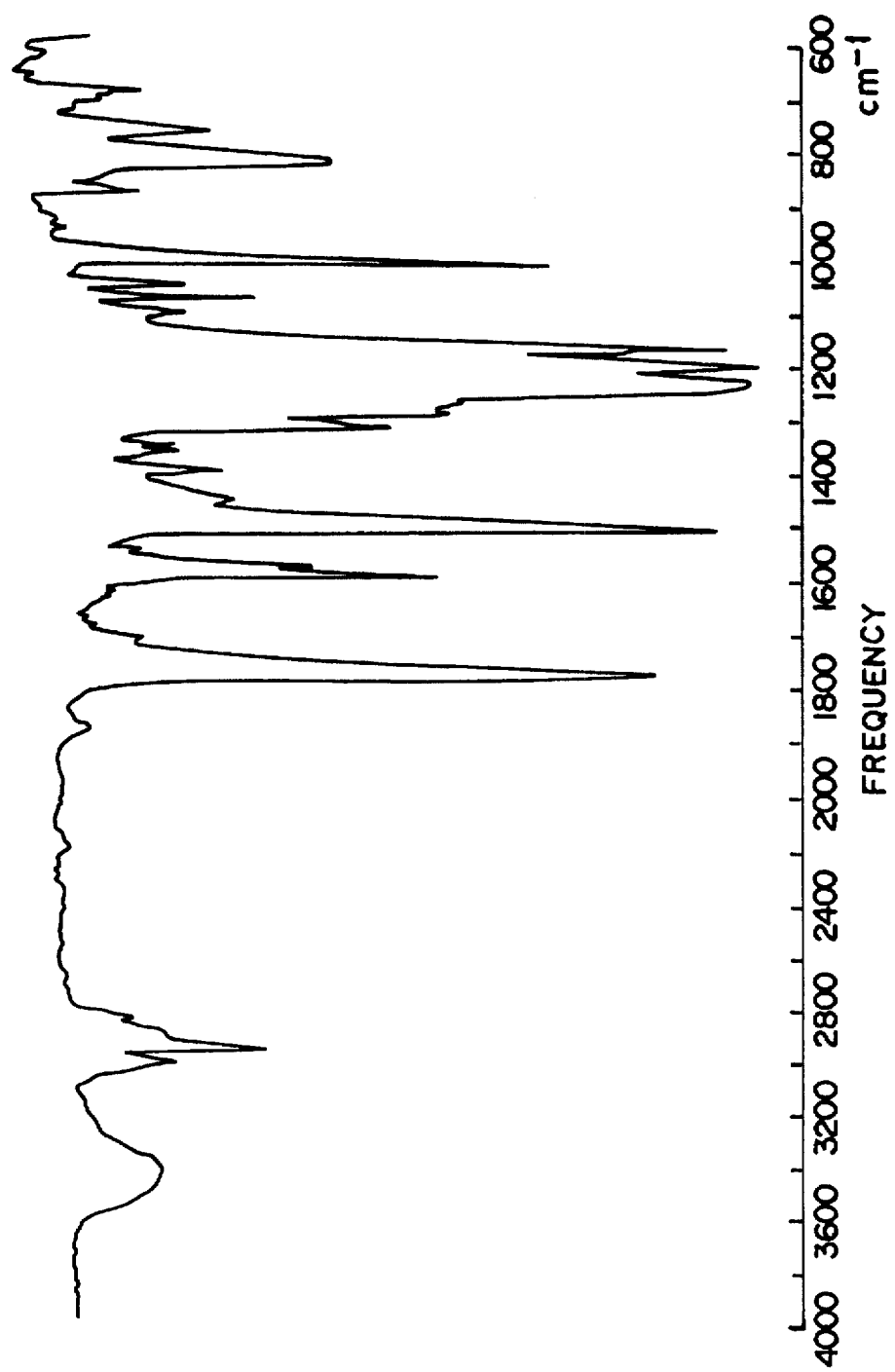
Figure 15:
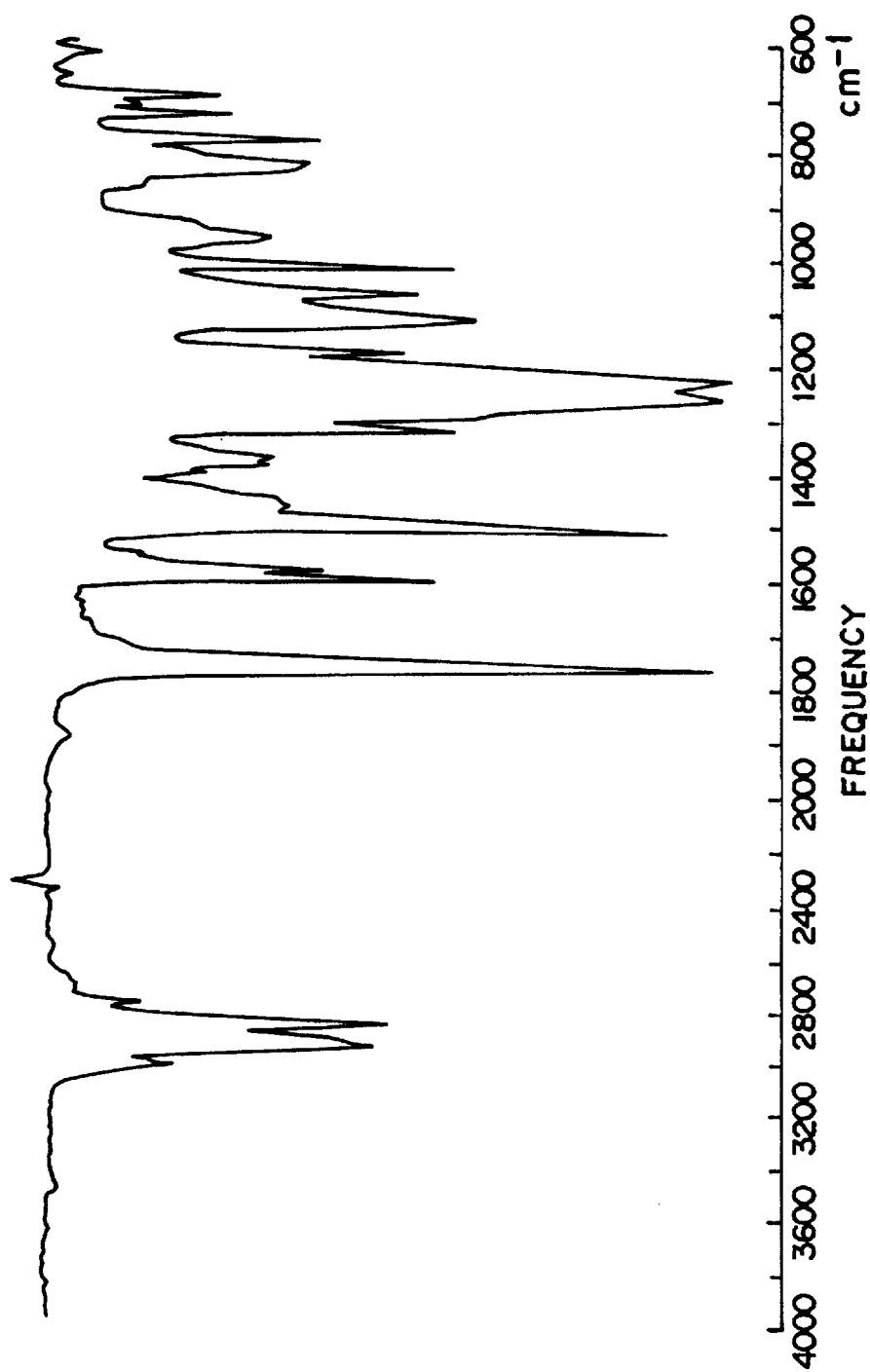
Figure 16:
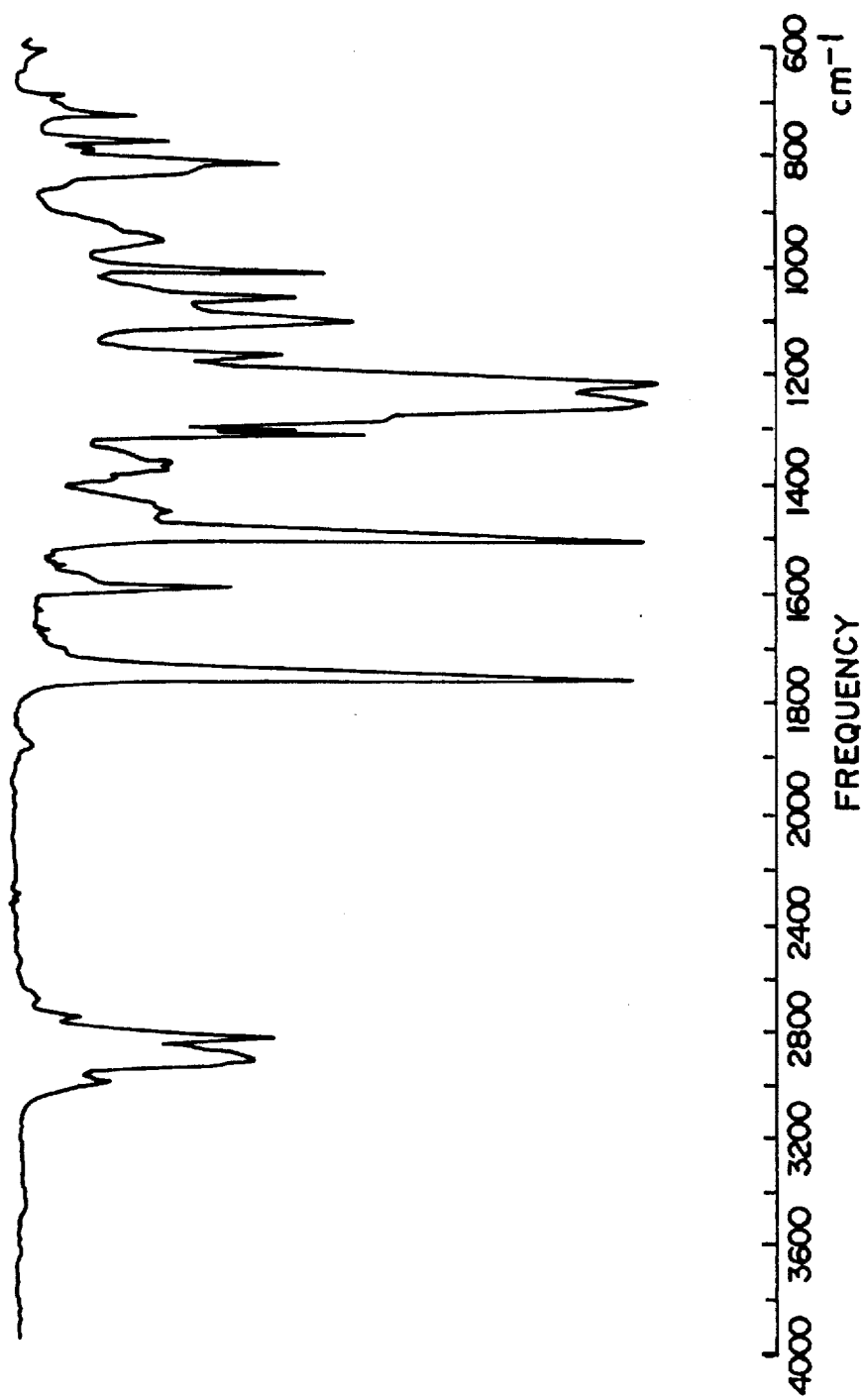
Figure 17:
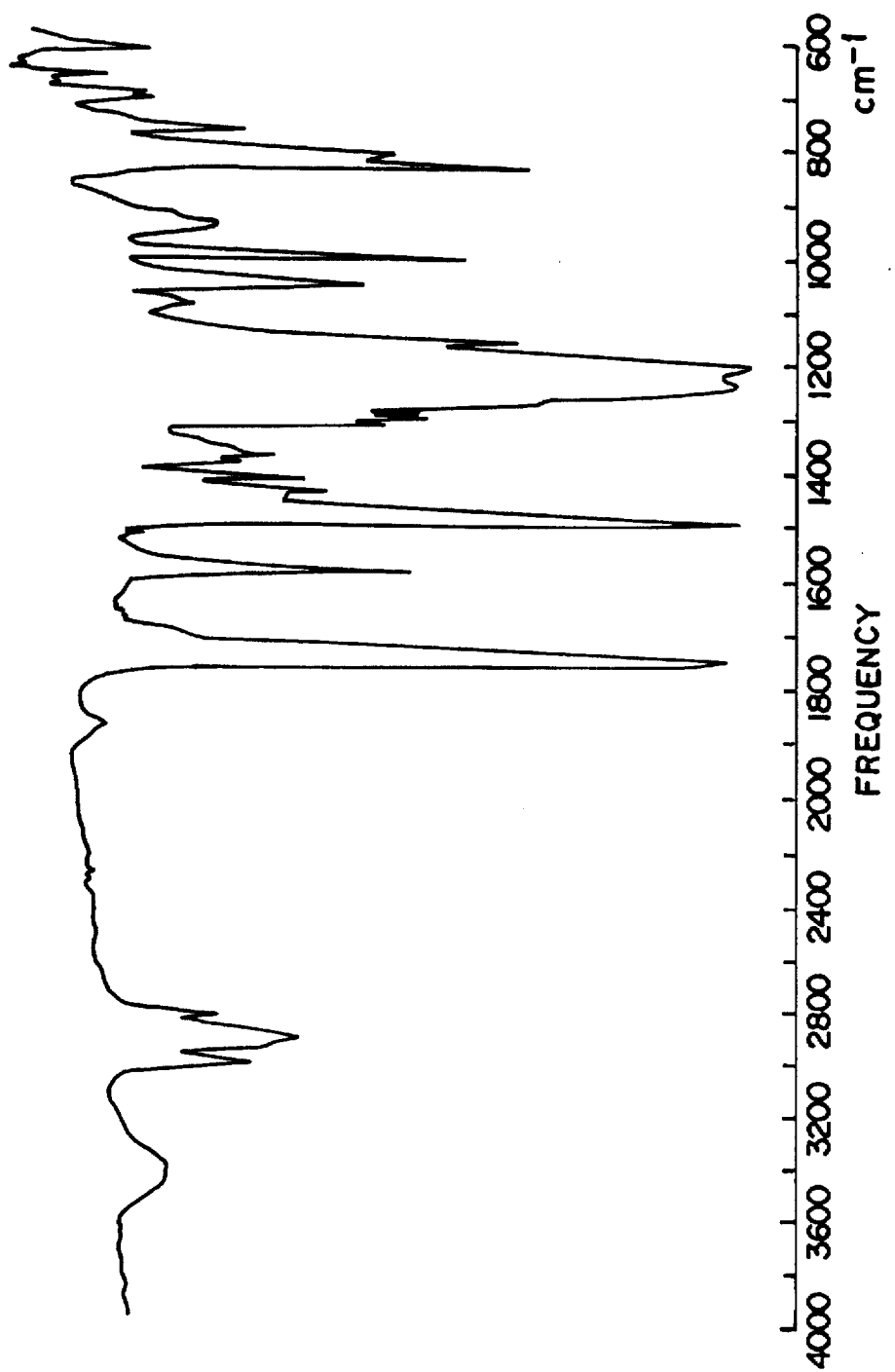
Figure 18:
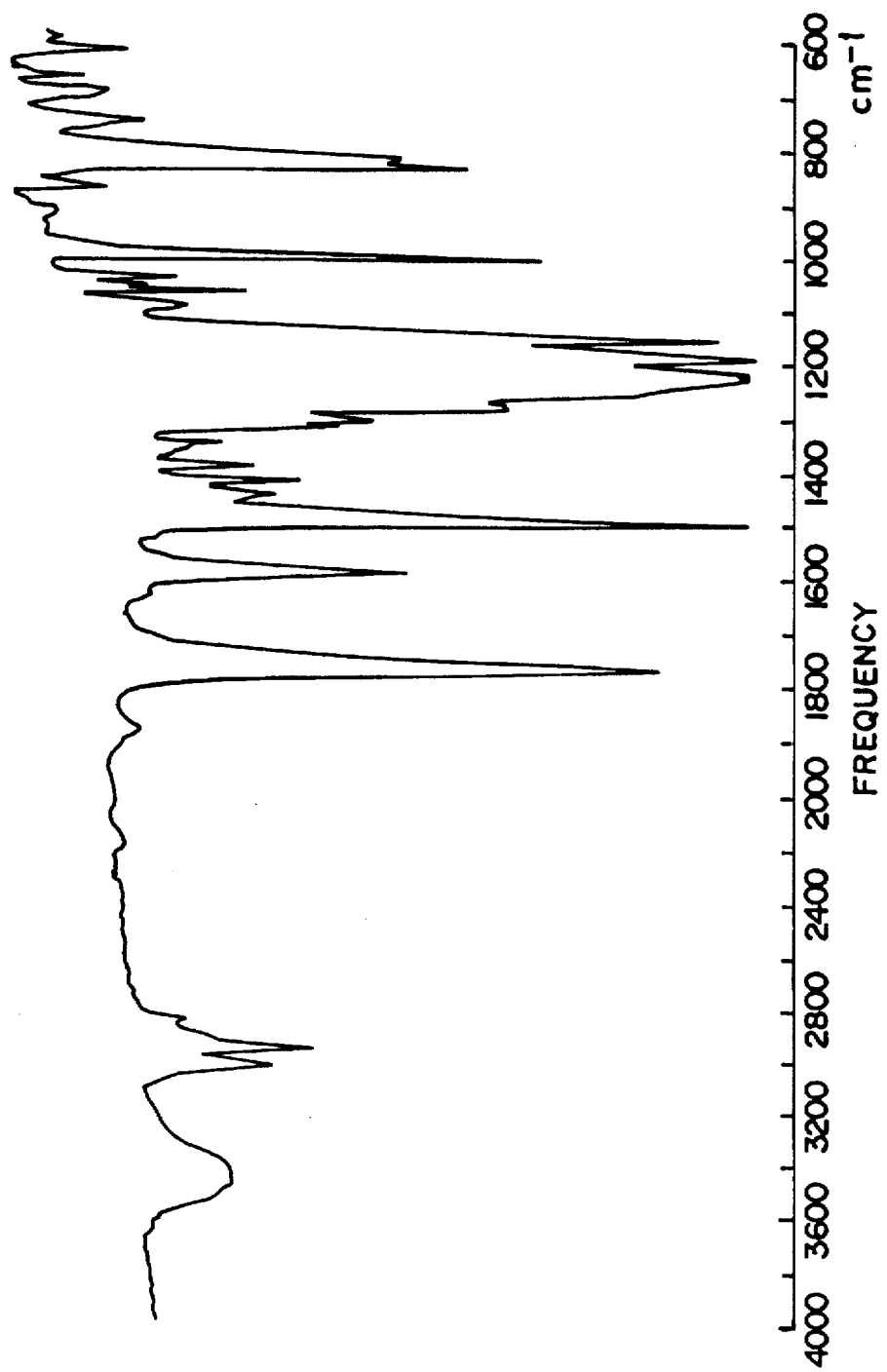
Figure 19:
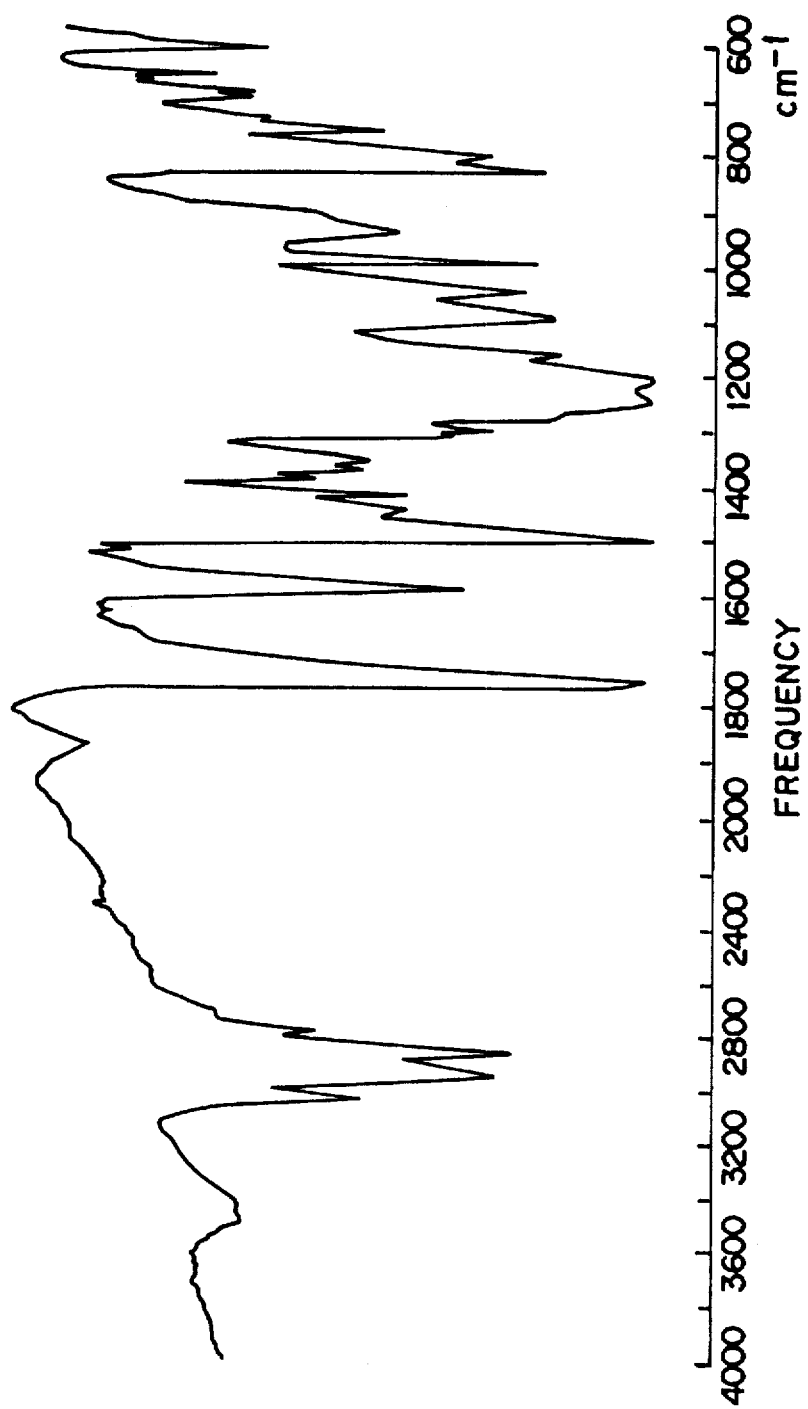

FIG. 7 shows an infrared spectrum of the aromatic polycarbonate resin (compound No. 1), taken by use of a KBr tablet.

Synthesis Examples 2 to 13

[Synthesis of aromatic polycarbonate resins]

A variety of aromatic polycarbonate resins according to the present invention as shown in Table 2 were obtained similarly in accordance with the synthesismethod as described in Synthesis Example 1.

The chemical formula of each aromatic polycarbonate resin is shown in Table 2; and the yield, the glass transition temperature (Tg), the polystyrene-reduced number-average molecular weight (Mn), the polystyrene-reduced weight-average molecular weight (Mw), and the results of the elemental analysis of each of the obtained aromatic polycarbonate resins are shown in Table 3.

FIGS. 8 to 19 show infrared spectra of the aromatic polycarbonate resins obtained in Synthesis Examples 2 to 13, taken by use of a KBr tablet.

TABLE 2

| Synthesis Example No. | Compound No.(*) | Chemical Formula |
|---|---|---|
| 1 | 1 | 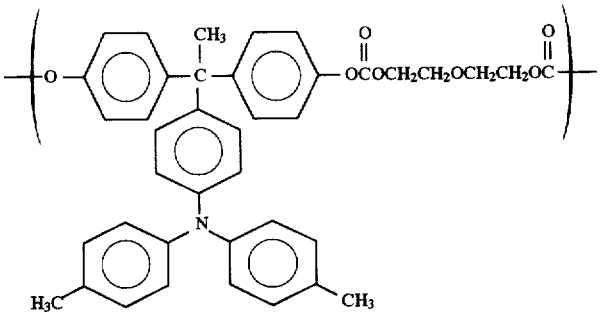 |
| 2 | 12 | 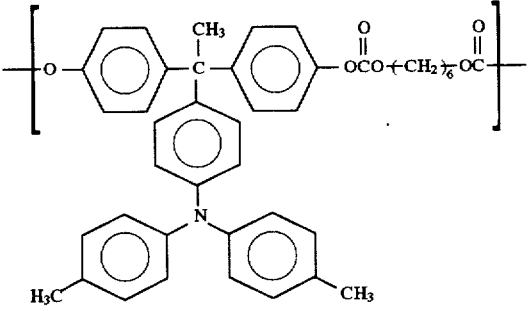 |
| 3 | 16 | 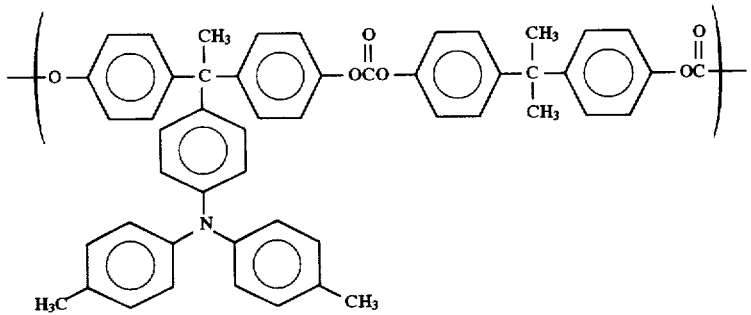 |
| 4 | 5 | 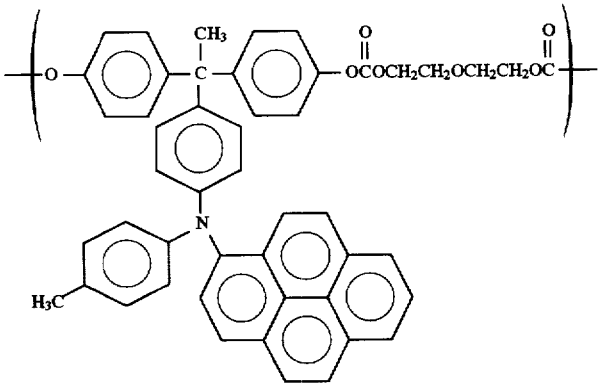 |

TABLE 2-continued
| Synthesis Example No. | Compound No.(*) | Chemical Formula |
|---|---|---|
| 5 | 6 | 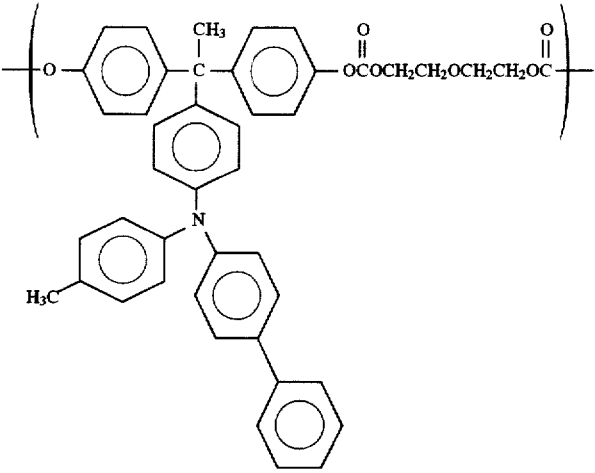 |
| 6 | 3 | 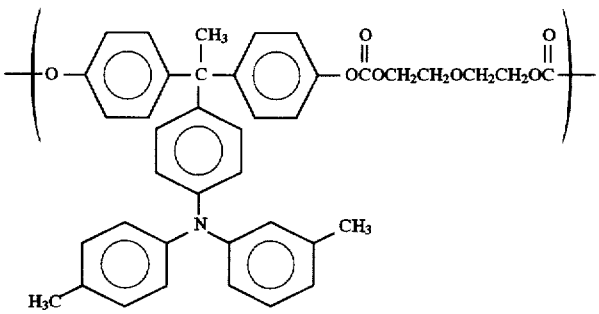 |
| 7 | 14 | 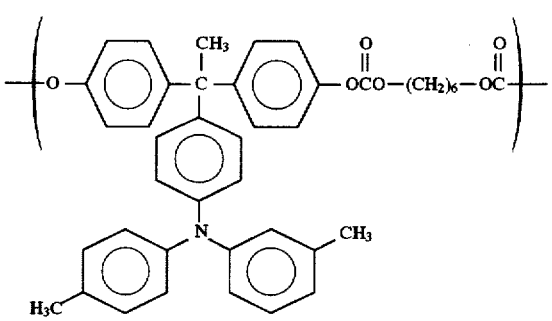 |
| 8 | 19 | 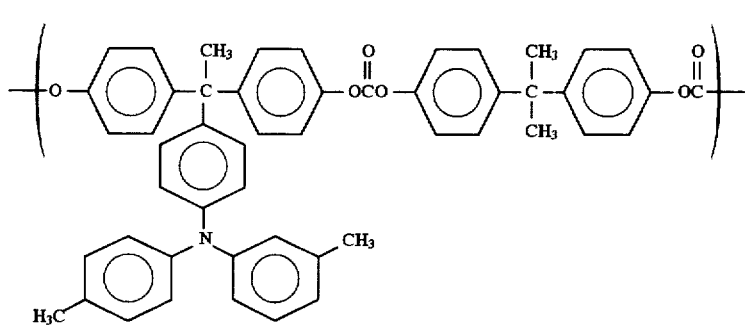 |

TABLE 2-continued
| Synthesis Example No. | Compound No.(*) | Chemical Formula |
|---|---|---|
| 9 | 39 | 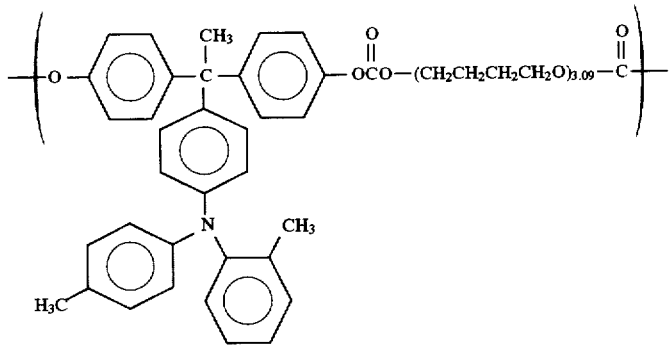 |
| 10 | 38 | 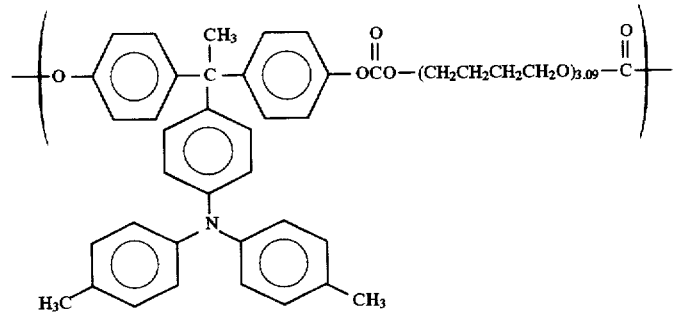 |
| 11 | 15 | 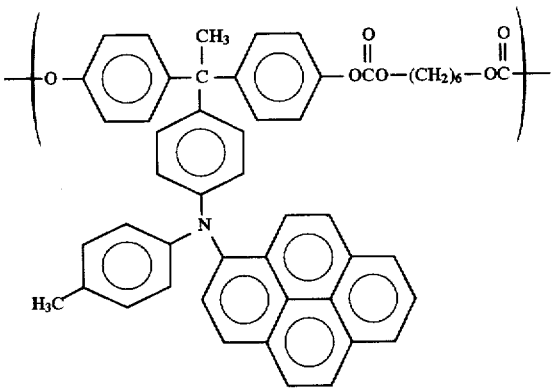 |
| 12 | 18 | 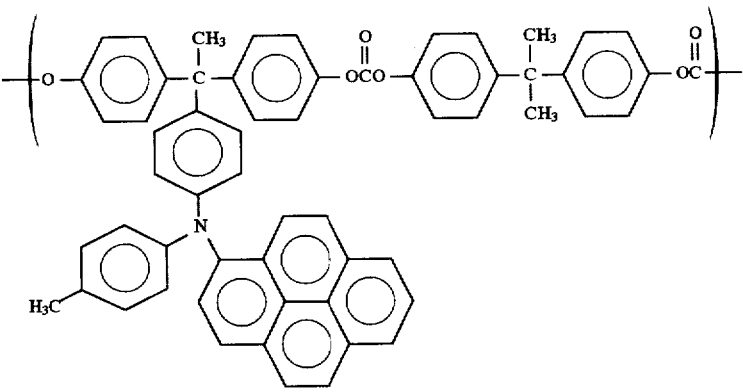 |

TABLE 2-continued

| Synthesis Example No. | Compound No.(*) | Chemical Formula |
|---|---|---|
| 13 | 40 | 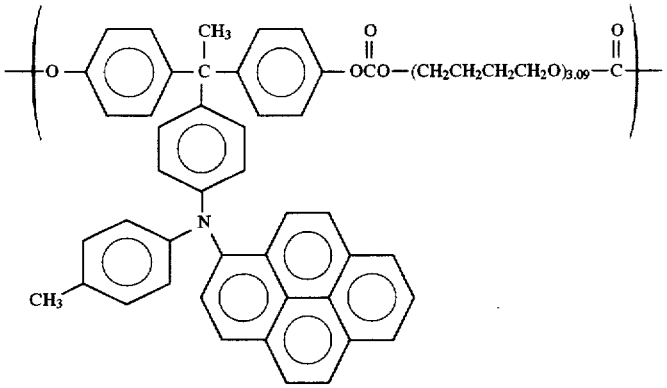 |

(*)The compound No. in Table 2 is corresponding to that shown in Table 1.

TABLE 3

| Synthesis Example No. | Compound No. | Yield (%) | Tg (°C.) | Average Molecular Weight | | Elemental Analysis Found (Calculated) | | |
|---|---|---|---|---|---|---|---|---|
| | | | | Mn | Mw | % C | % H | % N |
| 1 | 1 | 94.9 | 119 | 19000 | 46000 | 74.44 (74.63) | 5.86 (5.79) | 2.27 (2.18) |
| 2 | 12 | 96 | 109 | 13000 | 29000 | 77.02 (76.92) | 6.48 (6.30) | 1.92 (2.14) |
| 3 | 16 | 91 | 164 | 9100 | 20000 | 79.73 (79.98) | 5.82 (5.66) | 1.64 (1.83) |
| 4 | 5 | 97 | 155 | 16500 | 55700 | 77.99 (78.07) | 5.45 (5.21) | 1.91 (1.86) |
| 5 | 6 | 83 | 124 | 16000 | 44000 | 76.37 (76.58) | 5.71 (5.57) | 2.12 (1.98) |
| 6 | 3 | 90 | 106 | 24500 | 86400 | 74.82 (74.63) | 5.89 (5.79) | 2.26 (2.18) |
| 7 | 14 | 91 | 91 | 21200 | 54300 | 76.50 (76.92) | 6.33 (6.30) | 2.35 (2.14) |
| 8 | 19 | 89 | 142 | 8400 | 16900 | 79.93 (79.98) | 5.66 (5.66) | 2.11 (1.83) |
| 9 | 39 | 85 | 51 | 18800 | 40300 | 74.55 (74.62) | 7.12 (6.96) | 1.85 (1.80) |
| 10 | 38 | 86 | 57 | 19900 | 33700 | 74.90 (74.62) | 7.21 (6.96) | 1.84 (1.80) |
| 11 | 15 | 92 | 145 | 16500 | 50400 | 80.00 (79.98) | 5.65 (5.66) | 1.76 (1.83) |
| 12 | 18 | 72 | 156 | 3500 | 5100 | 81.82 (82.27) | 5.17 (5.18) | 1.49 (1.60) |
| 13 | 40 | 79 | 89 | 15500 | 22200 | 77.27 (76.67) | 7.32 (7.37) | 1.57 (1.56) |

Synthesis Example 14
[Synthesis of Aromatic Polycarbonate Resin (Compound No. 1 in Table 2)]

In a stream of nitrogen, a mixture of 5.70 g of 1,1-bis(4-acetoxyphenyl)-1-(4-di-p-tolylaminophenyl)ethane, 4.56 g of potassium hydroxide, 0.46 g of benzyl triethylammonium chloride, and 60 ml of water was heated to 85° C. with stirring, and then cooled to 5° C.

Then, a solution prepared by dissolving 2.54 g of diethylene glycol bis(chloroformate) in 60 ml of methylene chloride was added dropwise to the above prepared mixture at 4° to 5° C. over a period of one hour with vigorously stirring.

After completion of adding, the reaction mixture was stirred at room temperature for 2 hours, and then 50 ml of methylene chloride was added to the reaction mixture. The resulting organic layer was taken out and washed with water, and then added dropwise to 1.3 l of methanol, thereby obtaining a polymer.

The polymer thus obtained was reprecipitated with a mixture of methylene chloride and methanol twice, and dried, so that 4.67 g of the aromatic polycarbonate resin (Compound No. 1 in Table 2) having a repeat unit of the previously mentioned formula (VI) according to the present invention was obtained in a yield of 72.5%.

The polystyrene-reduced number-average molecular weight and weight-average molecular weight of the aromatic polycarbonate resin (Compound No. 1) were respectively 18,172 and 148,038.

The results of the elemental analysis of the thus obtained compound were as follows:

|  | % C | % H | % N |
| --- | --- | --- | --- |
| Calculated | 74.62 | 5.80 | 2.18 |
| Found | 74.50 | 5.91 | 2.31 |

Example 1

[Formation of Charge Generation Layer]

7.5 parts by weight of a bisazo pigment represented by the following formula (VII) serving as a charge generation material, and 500 parts by weight of a 0.5% tetrahydrofuran solution of a polyvinyl butyral resin (Trademark "XYHL" made by Union Carbide Japan K. K.) were dispersed and ground in a ball mill:

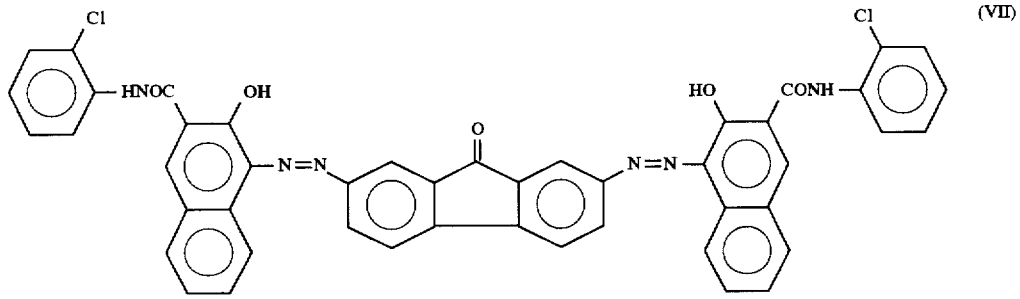

The thus prepared dispersion was coated on an aluminum surface of an aluminum-deposited polyester film by a doctor blade, and dried at room temperature, so that a charge generation layer with a thickness of about 1 μm was formed on the aluminum-deposited polyester film.

[Formation of Charge Transport Layer]

Two parts by weight of the aromatic polycarbonate resin (Compound No. 1 in Table 2 prepared in Synthesis Example 1), and 8 parts by weight of tetrahydrofuran were mixed and dissolved to form a coating solution for a charge transport layer. The above prepared charge transport layer coating liquid was coated on the above formed charge generation layer by a doctor blade, and dried at 80° C. for 2 minutes and then at 120° C. for 5 minutes, so that a charge transport layer with a thickness of 20 μm was formed on the charge generation layer.

Thus, an electrophotographic photoconductor No. 1 according to the present invention was obtained.

Example 2

The procedure for preparation of the layered electrophotographic photoconductor No. 1 in Example 1 was repeated except that the aromatic polycarbonate resin (Compound No. 1) for use in the charge transport layer coating liquid in Example 1 was replaced by an aromatic polycarbonate resin (Compound No. 5 in Table 2 prepared in Synthesis Example 4).

Thus, an electrophotographic photoconductor No. 2 according to the present invention was obtained.

Example 3

The procedure for preparation of the layered electrophotographic photoconductor No. 1 in Example 1 was repeated except that the bisazo pigment of formula (VII) for use in the charge generation layer coating liquid in Example 1 was replaced by a trisazo pigment represented by the following formula (VIII).

Thus, an electrophotographic photoconductor No. 3 according to the present invention was obtained.

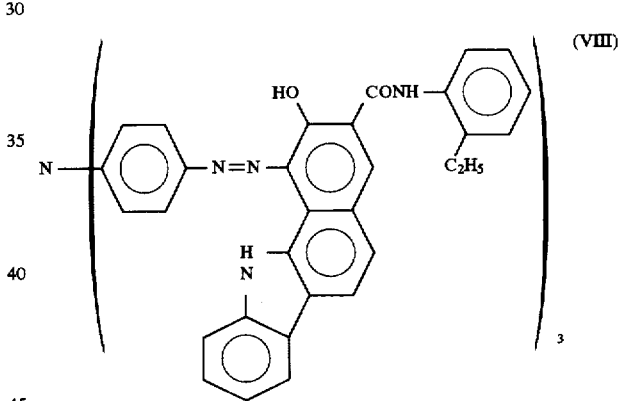

Example 4

The procedure for preparation of the layered electrophotographic photoconductor No. 3 in Example 3 was repeated except that the aromatic polycarbonate resin (Compound No. 1) for use in the charge transport layer coating liquid in Example 3 was replaced by an aromatic polycarbonate resin (Compound No. 5 in Table 2 prepared in Synthesis Example 4).

Thus, an electrophotographic photoconductor No. 4 according to the present invention was obtained.

Example 5

[Formation of Intermediate Layer]

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate with a thickness of 0.2 mm by a doctor blade and dried at room temperature, so that an intermediate layer with a thickness of 0.3 μm was provided on the aluminum plate.

45

[Formation of Charge Generation Layer]

A coating liquid for a charge generation layer prepared by dispersing the same bisazo pigment of formula (VII) as employed in Example 1 in cyclohexanone was coated on the above prepared intermediate layer by a doctor blade, and dried. Thus, a charge generation layer with a thickness of about 1 μm was formed on the intermediate layer.

[Formation of Charge Transport Layer]

The charge transport layer was provided on the above prepared charge generation layer by the same method as employed in Example 1.

Thus, an electrophotographic photoconductor No. 5 according to the present invention was obtained.

Examples 6 to 15

The procedure for preparation of the layered electrophotographic photoconductor No. 5 in Example 5 was repeated except that the aromatic polycarbonate resin (Compound No. 1) for use in the charge transport layer coating liquid in Example 5 was replaced by each of the aromatic polycarbonate resins as shown in Table 4.

Thus, electrophotographic photoconductors No. 6 to No. 15 according to the present invention were obtained.

Examples 16 to 19

The procedure for preparation of the layered electrophotographic photoconductor No. 5 in Example 5 was repeated except that the bisazo pigment of formula (VII) serving as the charge generation material for use in the charge generation layer coating liquid in Example 5 was replaced by the same trisazo pigment of formula (VIII) as used in Example 3, and that the aromatic polycarbonate resin (Compound No. 1) for use in the charge transport layer coating liquid in Example 5 was replaced by each of the aromatic polycarbonate resins as shown in Table 4.

Thus, electrophotographic photoconductors No. 16 to No. 19 according to the present invention were obtained.

Each of the electrophotographic photoconductors No. 1 through No. 19 according to the present invention obtained in Examples 1 to 19 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vpo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux.sec) required to reduce the initial surface potential Vpo (V) to ½ the initial surface potential Vpo (V) was measured. The results are shown in Table 4.

TABLE 4

| Example No. | Photo-conductor No. | Aromatic Polycarbonate Compound No. | -Vpo (V) | $E_{1/2}$ (lux · sec) |
| --- | --- | --- | --- | --- |
| 1 | 1 | 1 | 1418 | 1.75 |
| 2 | 2 | 5 | 1290 | 1.66 |
| 3 | 3 | 1 | 1160 | 1.50 |
| 4 | 4 | 5 | 1275 | 2.20 |
| 5 | 5 | 1 | 1236 | 1.21 |
| 6 | 6 | 5 | 1216 | 1.19 |

TABLE 4-continued

| Example No. | Photo-conductor No. | Aromatic Polycarbonate Compound No. | -Vpo (V) | $E_{1/2}$ (lux · sec) |
| --- | --- | --- | --- | --- |
| 7 | 7 | 12 | 1399 | 1.30 |
| 8 | 8 | 16 | 842 | 1.05 |
| 9 | 9 | 3 | 1388 | 1.40 |
| 10 | 10 | 14 | 1434 | 1.50 |
| 11 | 11 | 15 | 1595 | 1.09 |
| 12 | 12 | 19 | 1066 | 1.36 |
| 13 | 13 | 38 | 1330 | 1.32 |
| 14 | 14 | 39 | 1284 | 1.53 |
| 15 | 15 | 40 | 1360 | 1.02 |
| 16 | 16 | 1 | 1205 | 1.40 |
| 17 | 17 | 40 | 1287 | 1.15 |
| 18 | 18 | 15 | 1648 | 1.39 |
| 19 | 19 | 38 | 1304 | 1.36 |

Furthermore, each of the above obtained electrophotographic photoconductors No. 1 to No. 19 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

Example 20

[Formation of Intermediate Layer]

A commercially available polyamide resin (Trademark "CM-8000", made by Toray Industries, Inc.) was applied to the surface of an aluminum cylinder with a diameter of 80 mm and a stroke of 340 mm by spray coating and dried, so that an intermediate layer with a thickness of 0.3 μm was provided on the aluminum cylinder.

[Formation of Charge Generation Layer]

A coating liquid for a charge generation layer prepared by dispersing the same bisazo pigment of formula (VII) as employed in Example 1 in cyclohexanone was coated on the above prepared intermediate layer by spray coating, and dried. Thus, a charge generation layer with a thickness of 0.2 μm was formed on the intermediate layer.

[Formation of Charge Transport Layer]

A mixture of 10 parts by weight of the aromatic polycarbonate resin (Compound No. 1 in Table 2) and 60 parts by weight of methylene chloride was coated on the above prepared charge generation layer by a ring coater, and dried at 120° C. for 20 minutes, so that a charge transport layer with a thickness of 23 μm was provided on the charge generation layer.

Thus, an electrophotographic photoconductor No. 20 according to the present invention was obtained.

Comparative Example 1

The procedure for preparation of the layered electrophotographic photoconductor No. 20 in Example 20 was repeated except that the formulation for the charge transport layer coating liquid used in Example 20 was changed to the following formulation:

| (Formulation for charge transport layer coating liquid) | |
| --- | --- |
|  | Parts by weight |
| Polycarbonate resin (Trademark "Panlite TS-2050" made by Teijin Limited) | 100 |
| α-phenyl-4'-diphenylamino-stilbene | 90 |
| Methylene chloride | 800 |

Thus, a comparative electrophotographic photoconductor No. 1 was obtained.

Each of the electrophotographic photoconductors No. 20 according to the present invention and the comparative photoconductor No. 1 was set in a commercially available copying machine (Trademark "FT-2700", made by Ricoh Company, Ltd.), and 60,000 copies were made to evaluate the abrasion resistance of each photoconductor. After the completion of copying operation, the thickness of the photoconductor No. 20 according to the present invention was decreased by 0.68 μm, and that of the comparative photoconductor No. 1 was decreased by 2.85 μm.

As can be seen from the results of the above-mentioned abrasion resistance test, the photoconductor according to the present invention is superior to the conventional photoconductor of a low-molecular-weight charge transport material dispersed type with respect to the abrasion resistance.

As previously explained, the photoconductive layer of the electrophotographic photoconductor according to the present invention comprises an aromatic polycarbonate resin having a repeat unit with a triarylamine structure on the side chain thereof, which is represented by formula (I), so that the photosensitivity and durability of the photoconductor are sufficiently high. This is because the above-mentioned aromatic polycarbonate resin has the charge transporting properties and high mechanical strength.

Furthermore, the above-mentioned aromatic polycarbonate resin can be produced by allowing the diphenol compound of formula (II) having a tertiary amino group to react with the bischloroformate compound of formula (III). Such a preparation method of the aromatic polycarbonate resin is advantageous from the industrial viewpoint because a desired product can be speedily obtained under moderate conditions.

Japanese Patent Application Nos. 06-315722 and 06-315721 filed on Nov. 25, 1994, Japanese Patent Application Nos. 07-269175 and 07-269176 filed on Sep. 22, 1995, and Japanese Patent Application No. 07-333992 filed on Nov. 29, 1995 are hereby incorporated by reference.

What is claimed is:

1. An electrophotographic photoconductor comprising an electroconductive support, and a photoconductive layer formed thereon comprising (i) an effective component of an aromatic polycarbonate resin having a repeat unit of formula (I):

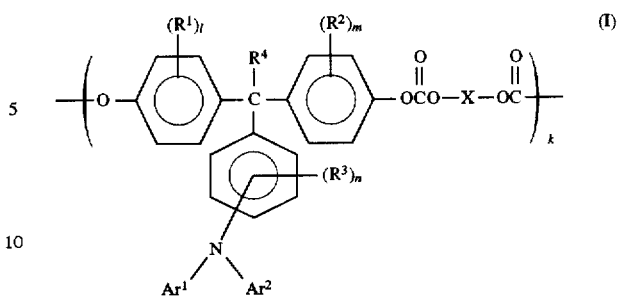

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

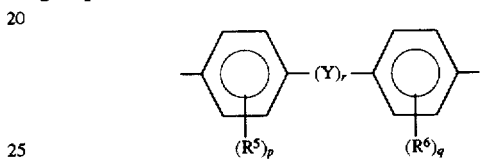

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)— and (ii) a sensitizing dye.

2. The electrophotographic photoconductor as claimed in claim 1, wherein said halogen atom represented by $R^1$, $R^2$, $R^3$, $R^5$, or $R^6$ in formula (I) is selected from the group consisting of fluorine, chlorine, bromine and iodine.

3. The electrophotographic photoconductor as claimed in claim 1, wherein said alkyl group represented by $R^1$, $R^2$, $R^3$, $R^4$, $R^5$, or $R^6$ in formula (I) is a straight-chain or branched alkyl group having 1 to 12 carbon atoms.

4. The electrophotographic photoconductor as claimed in claim 1, wherein said substituent of said alkyl group represented by $R^1$, $R^2$, $R^3$, $R^4$, $R^5$, or $R^6$ in formula (I) is selected from the group consisting of a fluorine atom, a hydroxyl group, a cyano group, an alkoxyl group having 1 to 4 carbon atoms, and a phenyl group which may have a substituent selected from the group consisting of a halogen atom, an alkyl group having 1 to 4 carbon atoms and an alkoxyl group having 1 to 4 carbon atoms.

5. The electrophotographic photoconductor as claimed in claim 1, wherein said aromatic hydrocarbon group represented by $Ar^1$, $Ar^2$, $R^5$ or $R^6$ is selected from the group consisting of phenyl, naphthyl, biphenylyl, terphenylyl, pentalenyl, indenyl, azulenyl, heptalenyl, biphenylenyl, as-indacenyl, fluorenyl, 9,9-dimethyl-2-fluorenyl, s-indacenyl, acenaphthylenyl, pleiadenyl, acenaphthenyl, phenalenyl, phenanthryl, anthryl, fluoranthenyl, acephenanthrylenyl, aceanthrylenyl, triphenylenyl, pyrenyl, chrysenyl and naphthacenyl.

6. The electrophotographic photoconductor as claimed in claim 1, wherein said substituent of said aromatic hydrocarbon group represented by $Ar^1$ or $Ar^2$ is selected from the group of a halogen atom, and a straight-chain or branched alkyl group having 1 to 5 carbon atoms which may have a substituent selected from the group consisting of a fluorine atom, a cyano group and a phenyl group which may have a substituent selected from the group consisting of a halogen atom and an alkyl group having 1 to 5 carbon atoms.

7. An electrophotographic photoconductor comprising an electroconductive support, and a photoconductive layer formed thereon comprising (i) a charge transport medium of an aromatic polycarbonate resin having a repeat unit of formula (I):

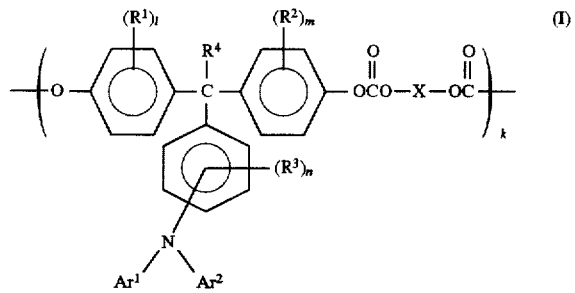

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

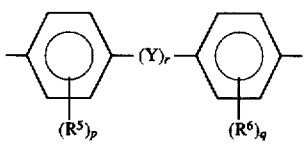

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)— containing (ii) a charge generation material.

8. The electrophotographic photoconductor as claimed in claim 7, wherein said halogen atom represented by $R^1$, $R^2$, $R^3$, $R^5$, or $R^6$ in formula (I) is selected from the group consisting of fluorine, chlorine, bromine and iodine.

9. The electrophotographic photoconductor as claimed in claim 7, wherein said alkyl group represented by $R^1$, $R^2$, $R^3$, $R^4$, $R^5$, or $R^6$ in formula (I) is a straight-chain or branched alkyl group having 1 to 12 carbon atoms.

10. The electrophotographic photoconductor as claimed in claim 7, wherein said substituent of said alkyl group represented by $R^1$, $R^2$, $R^3$, $R^4$, $R^5$, or $R^6$ in formula (I) is selected from the group consisting of a fluorine atom, a hydroxyl group, a cyano group, an alkoxyl group having 1 to 4 carbon atoms, and a phenyl group which may have a substituent selected from the group consisting of a halogen atom, an alkyl group having 1 to 4 carbon atoms and an alkoxyl group having 1 to 4 carbon atoms.

11. The electrophotographic photoconductor as claimed in claim 7, wherein said aromatic hydrocarbon group represented by $Ar^1$, $Ar^2$, $R^5$ or $R^6$ is selected from the group consisting of phenyl, naphthyl, biphenylyl, terphenylyl, pentalenyl, indenyl, azulenyl, heptalenyl, biphenylenyl, as-indacenyl, fluorenyl, 9,9-dimethyl-2-fluorenyl, s-indacenyl, acenaphthylenyl, pleiadenyl, acenaphthenyl, phenalenyl, phenanthryl, anthryl, fluoranthenyl, acephenanthrylenyl, aceanthrylenyl, triphenylenyl, pyrenyl, chrysenyl and naphthacenyl.

12. The electrophotographic photoconductor as claimed in claim 7, wherein said substituent of said aromatic hydrocarbon group represented by $Ar^1$ or $Ar^2$ is selected from the group consisting of a halogen atom, and a straight-chain or branched alkyl group having 1 to 5 carbon atoms which may have a substituent selected from the group consisting of a fluorine atom, a cyano group and a phenyl group which may have a substituent selected from the group consisting of a halogen atom and an alkyl group having 1 to 5 carbon atoms.

13. An electrophotographic photoconductor comprising an electroconductive support, and a two-layered photoconductive layer formed thereon comprising (i) a first layer of a charge generation layer containing a charge generation material and (ii) a second layer of a charge transport layer of an aromatic polycarbonate resin having a repeat unit of formula (I):

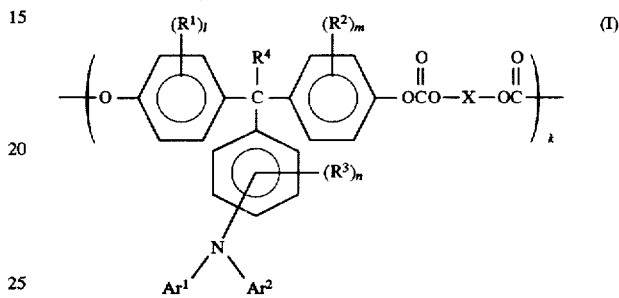

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

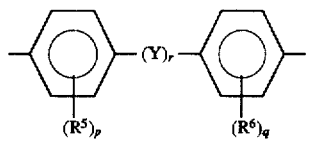

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—.

14. The electrophotographic photoconductor of claim 13, further comprising a protective layer on said (ii) polycarbonate charge transport layer.

15. The electrophotographic photoconductor as claimed in claim 13, wherein said halogen atom represented by $R^1$, $R^2$, $R^3$, $R^5$, or $R^6$ in formula (I) is selected from the group consisting of fluorine, chlorine, bromine and iodine.

16. The electrophotographic photoconductor as claimed in claim 13, wherein said alkyl group represented by $R^1$, $R^2$, $R^3$, $R^4$, $R^5$, or $R^6$ in formula (I) is a straight-chain or branched alkyl group having 1 to 12 carbon atoms.

17. The electrophotographic photoconductor as claimed in claim 13, wherein said substituent of said alkyl group represented by $R^1$, $R^2$, $R^3$, $R^4$, $R^5$, or $R^6$ in formula (I) is selected from the group consisting of a fluorine atom, a hydroxyl group, a cyano group, an alkoxyl group having 1 to 4 carbon atoms, and a phenyl group which may have a substituent selected from the group consisting of a halogen atom, an alkyl group having 1 to 4 carbon atoms and an alkoxyl group having 1 to 4 carbon atoms.

18. The electrophotographic photoconductor as claimed in claim 15, wherein said aromatic hydrocarbon group represented by $Ar^1$, $Ar^2$, $R^5$ or $R^6$ is selected from the group consisting of phenyl, naphthyl, biphenylyl, terphenylyl, pentalenyl, indenyl, azulenyl, heptalenyl, biphenylenyl, as-indacenyl, fluorenyl, 9,9-dimethyl-2-fluorenyl, s-indacenyl, acenaphthylenyl, pleiadenyl, acenaphthenyl, phenalenyl, phenanthryl, anthryl, fluoranthenyl, acephenanthrylenyl, aceanthrylenyl, triphenylenyl, pyrenyl, chrysenyl and naphthacenyl.

19. The electrophotographic photoconductor as claimed in claim 13, wherein said substituent of said aromatic hydrocarbon group represented by $Ar^1$ or $Ar^2$ is selected from the group consisting of a halogen atom, and a straight-chain or branched alkyl group having 1 to 5 carbon atoms which may have a substituent selected from the group consisting of a fluorine atom, a cyano group and a phenyl group which may have a substituent selected from the group consisting of a halogen atom and an alkyl group having 1 to 5 carbon atoms.

20. An electrophotographic photoconductor comprising an (a) electroconductive support and (b) a charge transport layer formed thereon comprising an effective component of an aromatic polycarbonate resin having a repeat unit of formula (I):

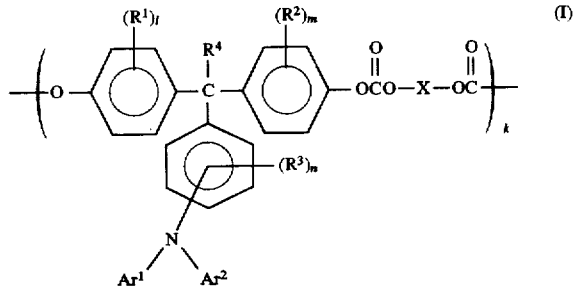

wherein $R^1$, $R^2$ and $R^3$ each is an alkyl group which may have a substituent, or a halogen atom; $R^4$ is a hydrogen atom, or an alkyl group which may have a substituent; $Ar^1$ and $Ar^2$ each is an aromatic hydrocarbon group which may have a substituent; l, m and n each is an integer of 0 to 4; k is an integer of 5 to 5,000; and X is a bivalent aliphatic group, a bivalent cyclic aliphatic group, or

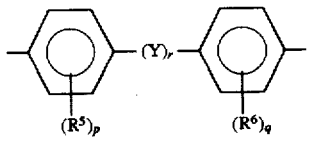

in which $R^5$ and $R^6$ each is an alkyl group which may have a substituent, a halogen atom, or an aromatic hydrocarbon group; p and q each is an integer of 0 to 4; and r is 0 or 1, and when r is 1, Y is a straight-chain, branched or cyclic alkylene group having 1 to 12 carbon atoms, —O—, —S—, —SO—, —SO$_2$—, or —C(O)—, and (c) a charge generation layer on said layer (b) containing a charge generation material.

21. The electrophotographic photoconductor of claim 20, wherein said charge generation layer (c) has a protective layer (d) thereon.

22. The electrophotographic photoconductor as claimed in claim 20, wherein said halogen atom represented by $R^1$, $R^2$, $R^3$ $R^5$, or $R^6$ in formula (I) is selected from the group consisting of fluorine, chlorine, bromine and iodine.

23. The electrophotographic photoconductor as claimed in claim 20, wherein said alkyl group represented by $R^1$, $R^2$, $R^3$, $R^4$, $R^5$, or $R^6$ in formula (I) is a straight-chain or branched alkyl group having 1 to 12 carbon atoms.

24. The electrophotographic photoconductor as claimed in claim 20, wherein said substituent of said alkyl group represented by $R^1$, $R^2$, $R^3$, $R^4$, $R^5$, or $R^6$ in formula (I) is selected from the group consisting of a fluorine atom, a hydroxyl group, a cyano group, an alkoxyl group having 1 to 4 carbon atoms, and a phenyl group which may have a substituent selected from the group consisting of a halogen atom, an alkyl group having 1 to 4 carbon atoms and an alkoxyl group having 1 to 4 carbon atoms.

25. The electrophotographic photoconductor as claimed in claim 20, wherein said aromatic hydrocarbon group represented by $Ar^1$, $Ar^2$, $R^5$ or $R^6$ is selected from the group consisting of phenyl, naphthyl, biphenylyl, terphenylyl, pentalenyl, indenyl, azulenyl, heptalenyl, biphenylenyl, as-indacenyl, fluorenyl, 9,9-dimethyl-2-fluorenyl, s-indacenyl, acenaphthylenyl, pleiadenyl, acenaphthenyl, phenalenyl, phenanthryl, anthryl, fluoranthenyl, acephenanthrylenyl, aceanthrylenyl, triphenylenyl, pyrenyl, chrysenyl and naphthacenyl.

26. The electrophotographic photoconductor as claimed in claim 20, wherein said substituent of said aromatic hydrocarbon group represented by $Ar^1$ or $Ar^2$ is selected rom the group consisting of a halogen atom, and a straight-chain or branched alkyl group having 1 to 5 carbon atoms which may have a substituent selected from the group consisting of a fluorine atom, a cyano group and a phenyl group which may have a substituent selected from the group consisting of a halogen atom and an alkyl group having 1 to 5 carbon atoms.

* * * * *

UNITED STATES PATENT AND TRADEMARK OFFICE
CERTIFICATE OF CORRECTION

PATENT NO. : 5,747,204
DATED : May 5, 1998
INVENTOR(S) : Mitsutoshi Anzai et al.

It is certified that error appears in the above-identified patent and that said Letters Patent is hereby corrected as shown below:

Column 34, line 66 "with the synthesismethod" should read --with the synthesis method--.

Column 52, line 13 "$R^2$, $R^3$ $R^5$," should read --$R^2$, $R^3$, $R^5$,--.

Column 52, line 41 "is selected rom" should read --is selected from--.

Signed and Sealed this

Twenty-fifth Day of May, 1999

Attest:

Q. TODD DICKINSON

*Attesting Officer*    Acting Commissioner of Patents and Trademarks